(12) United States Patent
Zhang et al.

(10) Patent No.: US 10,674,141 B1
(45) Date of Patent: Jun. 2, 2020

(54) APPARATUSES, SYSTEMS, AND METHODS FOR DETERMINING INTERPUPILLARY DISTANCES OF HEAD-MOUNTED DISPLAYS

(71) Applicant: FACEBOOK TECHNOLOGIES, LLC, Menlo Park, CA (US)

(72) Inventors: Rui Zhang, Redwood City, CA (US); Dong Yang, Milpitas, CA (US)

(73) Assignee: Facebook Technologies, LLC, Menlo Park, CA (US)

(*) Notice: Subject to any disclaimer, the term of this patent is extended or adjusted under 35 U.S.C. 154(b) by 167 days.

(21) Appl. No.: 15/877,407

(22) Filed: Jan. 23, 2018

(51) Int. Cl.
| | | |
|---|---|---|
| *H04N 13/344* | (2018.01) | |
| *G02B 27/01* | (2006.01) | |
| *G02B 27/18* | (2006.01) | |
| *G02B 7/00* | (2006.01) | |
| *H04N 13/371* | (2018.01) | |
| *G02B 30/34* | (2020.01) | |

(52) U.S. Cl.
CPC .......... *H04N 13/344* (2018.05); *G02B 7/003* (2013.01); *G02B 27/0176* (2013.01); *G02B 27/0179* (2013.01); *G02B 27/18* (2013.01); *G02B 30/34* (2020.01); *H04N 13/371* (2018.05)

(58) Field of Classification Search
CPC ........ G06F 3/1423–1446; G06F 3/147; H04N 13/332; H04N 13/344; H04N 13/366; H04N 13/371; G02B 27/017; G02B 27/0172; G02B 27/0176; G02B 27/0179; G02B 27/18; G02B 27/2228; G02B 2027/0178; G02B 2027/0181–0187
See application file for complete search history.

(56) References Cited

U.S. PATENT DOCUMENTS

| | | | | |
|---|---|---|---|---|
| 2014/0375540 | A1* | 12/2014 | Ackerman | G06F 3/013 345/156 |
| 2014/0375790 | A1* | 12/2014 | Robbins | G02B 27/0172 348/78 |
| 2016/0349516 | A1* | 12/2016 | Alexander | G06F 3/013 |
| 2017/0017082 | A1* | 1/2017 | Wakabayashi | G02B 27/0172 |
| 2018/0091805 | A1* | 3/2018 | Liang | H04N 13/344 13/344 |

* cited by examiner

*Primary Examiner* — Nathan Danielsen
(74) *Attorney, Agent, or Firm* — FisherBroyles, LLP

(57) ABSTRACT

A head-mounted-display system may include 1) a support assembly and 2) a pair of display assemblies moveably coupled to the support assembly such that the display assemblies are moveable between a plurality of positions corresponding to a plurality of user interpupillary distances, with the pair of display assemblies respectively defining separate viewing regions for a user's right and left eyes. Each of the pair of display assemblies may include a lens and a display screen. The head-mounted-display system may also include a detection subsystem having 1) at least one position sensor and 2) a determination module that determines a positional relationship between the pair of display assemblies based on measurements obtained by the at least one position sensor. Various other methods, systems, and computer-readable media are also disclosed.

20 Claims, 17 Drawing Sheets

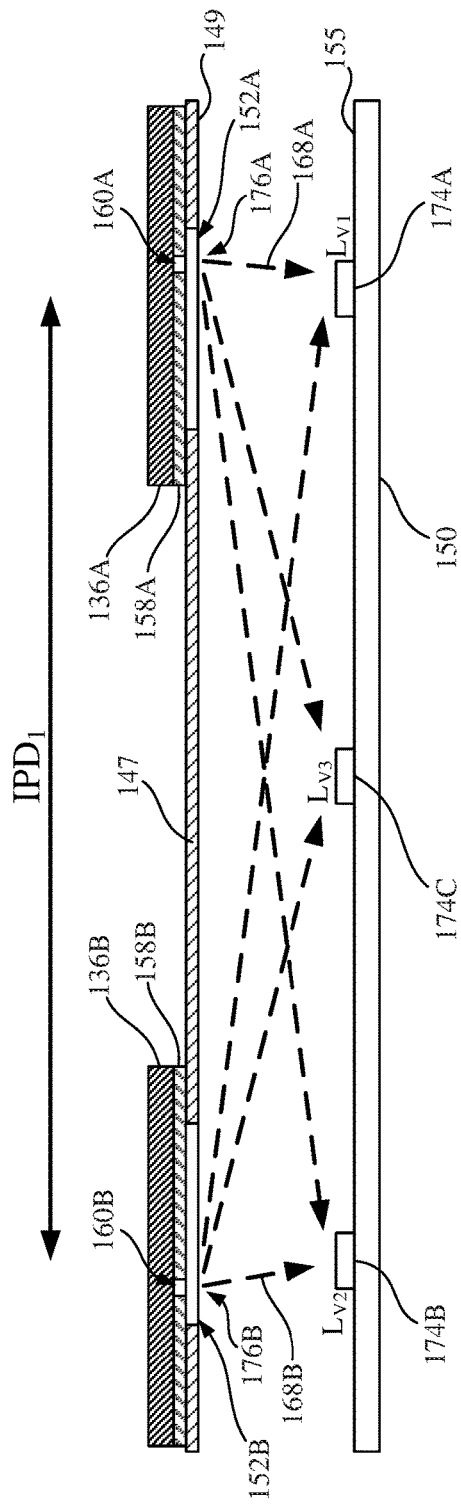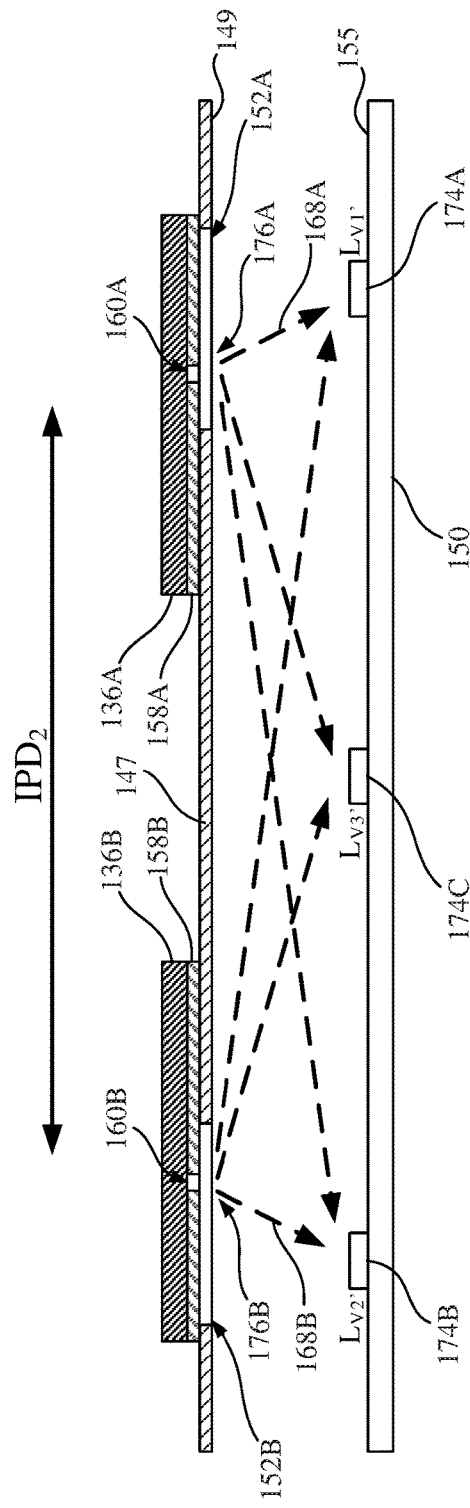

APPARATUSES, SYSTEMS, AND METHODS FOR DETERMINING INTERPUPILLARY DISTANCES OF HEAD-MOUNTED DISPLAYS

BACKGROUND

Virtual reality and augmented reality headsets are widely gaining in popularity for use in a growing number of activities. Such headsets may integrate visual information into a user's field of view to enhance their surroundings or allow them to step into immersive three-dimensional environments. While virtual reality and augmented reality headsets are often utilized for gaming and other entertainment purposes, they are also commonly employed for purposes outside of recreation—for example, governments may use them for military training simulations, doctors may use them to practice surgery, and engineers may use them as visualization aids. Virtual and augmented reality systems are also increasingly recognized for their utility in facilitating interpersonal interactions between individuals in a variety of contexts.

Such headsets commonly include display and optical elements that project separate images to the eyes of users so that the users perceive three-dimensional content. Unfortunately, variations in the shapes of human faces may present difficulties in properly displaying these images to users. For example, variations in users' interpupillary distances (i.e., the distance between a person's eyes) may cause discomfort to users due to optical distortions, eye strain, and/or facial discomfort if display elements are not precisely configured to accommodate such variations. Because of this, traditional virtual reality and augmented reality headsets may include adjustment mechanisms to tailor the spacing between optical elements to more precisely fit each user's unique interpupillary distance. In addition, measurement devices, such as linear potentiometers, may be utilized to determine distances between optical elements of headsets to ensure that content is properly displayed to users. Unfortunately, such measurements devices may be mechanically complex and bulky and may impede smooth and precise adjustment of the optical elements.

SUMMARY

As will be described in greater detail below, the instant disclosure describes apparatuses, systems, and methods for determining interpupillary distances of head-mounted displays. For example, a head-mounted-display system may include 1) a support assembly and 2) a pair of display assemblies moveably coupled to the support assembly such that the pair of display assemblies are moveable between a plurality of positions corresponding to a plurality of user interpupillary distances, with the pair of display assemblies respectively defining separate viewing regions for a user's right and left eyes. In some embodiments, each of the pair of display assemblies may include a lens and a display screen having a display area that projects image light toward the lens. The head-mounted-display system may also include a detection subsystem having 1) at least one position sensor that measures emissions from a tracked region of at least one display assembly of the pair of display assemblies and 2) a determination module that determines a positional relationship between the pair of display assemblies based on the emissions measured by the at least one position sensor. According to some embodiments, the positional relationship between the pair of display assemblies may include a user interpupillary distance corresponding to a position of the pair of display assemblies with respect to each other.

The at least one position sensor may include at least one optical sensor that measures quantities of light emitted from the tracked region of the at least one display assembly. In this example, the tracked region of the at least one display assembly may include a tracking opening defined in a back light-blocking layer of the display screen of the at least one display assembly that is disposed opposite a front surface of the display screen of the at least one display assembly through which image light is projected. A portion of light generated by the display screen may pass through the tracking opening. In at least one example, the support assembly may include a dividing member extending between the display screen of the at least one display assembly and the at least one optical sensor. A dividing-member opening may be defined in a portion of the dividing member that at least partially overlaps the tracking opening defined in the back light-blocking layer of the display screen of the at least one display assembly. The tracking opening defined in the back light-blocking layer of the display screen of the at least one display assembly may extend longitudinally in a first direction parallel to a back surface of the back light-blocking layer. The dividing-member opening defined in the dividing member of the support assembly may extend longitudinally in a second direction that is nonparallel to the first direction.

According to various embodiments, the head-mounted-display system may further include at least one reflective element for reflecting at least a portion of the light emitted from the tracked region of the at least one display assembly toward the at least one optical sensor. The at least one reflective element may be disposed outside the pair of display assemblies. Additionally or alternatively, the head-mounted-display system may further include at least one collimator for directing at least a portion of light emitted from the tracked region of the at least one display assembly toward the at least one optical sensor. The tracked region of the at least one display assembly may include a magnetic element. In this example, the at least one position sensor may include at least one magnetic field sensor that measures a magnetic field emitted by the magnetic element. The at least one magnetic field sensor may be, for example, a magnetoresistive sensor.

In some embodiments, the at least one position sensor may include a plurality of discrete position sensors that each measure the emissions from the tracked region of the at least one display assembly. In this example, the determination module may determine the positional relationship between the pair of display assemblies based on the emissions measured by the plurality of discrete position sensors. In at least one embodiment, the tracked region of the at least one display assembly may be located outside the display area. Additionally or alternatively, the tracked region of the at least one display assembly may be located on a back surface of the display screen of the at least one display assembly that is opposite a front surface of the display screen of the at least one display assembly through which image light is projected. In some examples, the at least one position sensor may be disposed on a printed circuit board. The head-mounted-display system may include a display adjustment assembly for adjusting positions of the pair of display assemblies with respect to each other.

A corresponding head-mounted-display device may include 1) a display housing, 2) a support assembly mounted to the display housing, 3) a pair of display assemblies moveably coupled to the support assembly, and 4) a detection subsystem. According to some embodiments, the display housing may include a viewing opening and an end surface disposed opposite the viewing opening. In this example, the at least one position sensor may be disposed between the tracked region of the at least one display assembly and the end surface of the display housing.

In addition, a corresponding method may include measuring, by at least one position sensor of a detection subsystem, emissions from a tracked region of at least one display assembly of a pair of display assemblies of a head-mounted-display system, with the pair of display assemblies moveably coupled to a support assembly such that the pair of display assemblies are moveable between a plurality of positions corresponding to a plurality of user interpupillary distances and the pair of display assemblies respectively defining separate viewing regions for a user's right and left eyes. Each of the pair of display assemblies may include a lens and a display screen having a display area that projects image light toward the lens. The method may also include determining, by a determination module, a positional relationship between the pair of display assemblies based on the emissions measured by the at least one position sensor.

In at least one embodiment, the method may include 1) adjusting, by a display adjustment assembly, positions of the pair of display assemblies with respect to each other, 2) measuring, by the at least one position sensor of the detection subsystem, additional emissions from the tracked region of the at least one display assembly of the pair of display assemblies disposed in the adjusted positions, and 3) determining, by the determination module, an adjusted positional relationship between the pair of display assemblies based on the additional emissions measured by the at least one position sensor.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIGS. 9A and 9B are rear views of exemplary left- and right-eye display screens and an exemplary dividing member in accordance with some embodiments.

FIGS. 10A and 10B are cross-sectional top views of exemplary left- and right-eye display screens, an exemplary dividing member, and exemplary optical sensors mounted on a printed circuit board in accordance with some embodiments.

Figure 1:
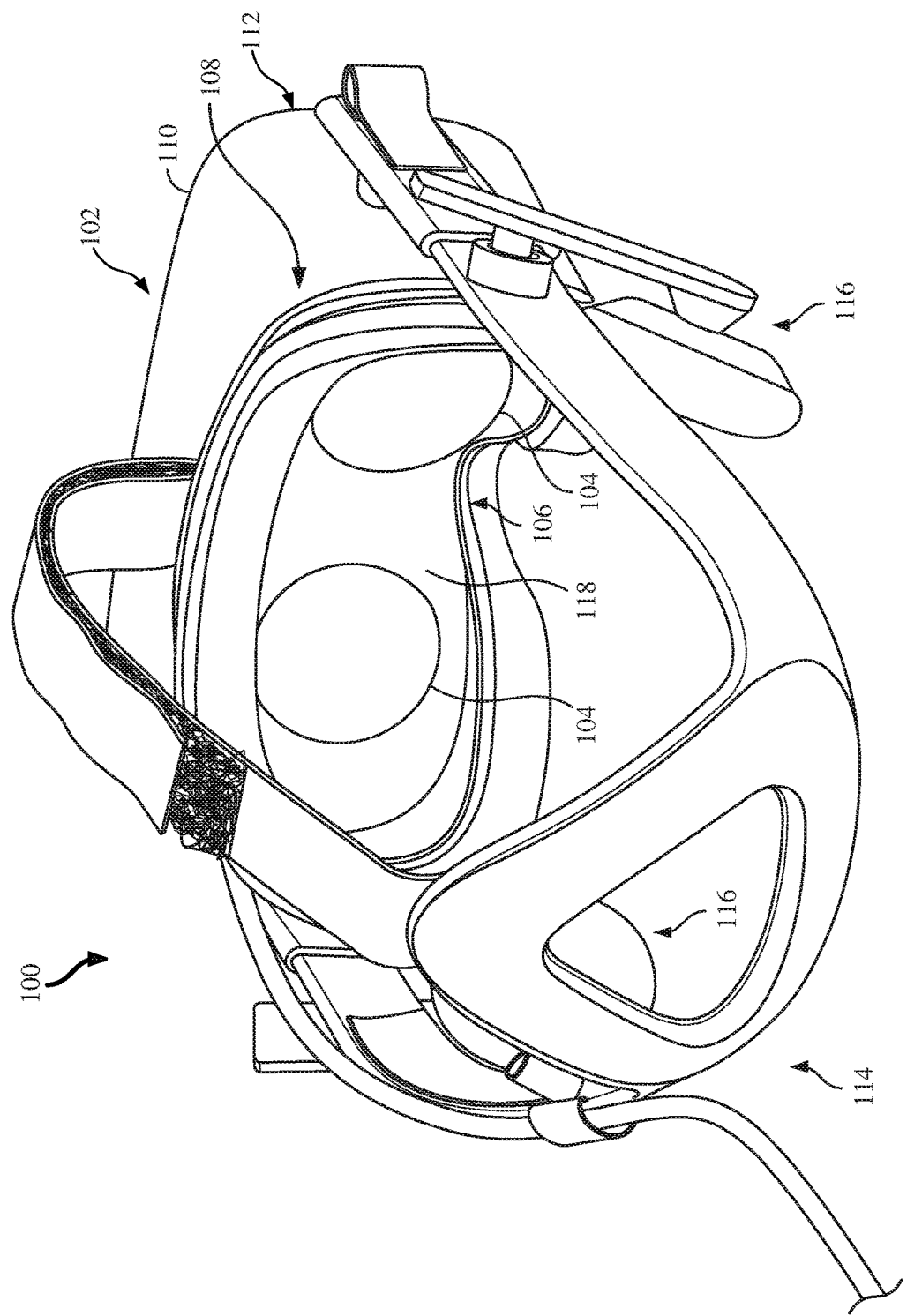
FIG. 1 is a perspective view of an exemplary head-mounted-display system in accordance with some embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to apparatuses, systems, and methods for determining interpupillary distances of head-mounted displays. As will be explained in greater detail below, embodiments of the instant disclosure may include a head-mounted-display system having a pair of display assemblies that are moveable between a plurality of positions corresponding to a plurality of user interpupillary distances. The pair of display assemblies may respectively define separate viewing regions for a user's right and left eyes and may each include, for example, an eye cup, a lens, and/or a display screen. The head-mounted-display system may include a detection subsystem having at least one sensor that measures emissions (e.g., emitted light, a magnetic field, etc.) from a tracked region of at least one display assembly of the pair of display assemblies. The detection subsystem may also include a determination module that determines a positional relationship between the pair of display assemblies based on the emissions measured by the at least one sensor.

The disclosed apparatuses, systems, and methods may enable precise determination of a user's interpupillary distance based, for example, on positional relationships between the display assemblies. Such interpupillary distance determinations may be made while minimizing the weight, mechanical complexity, and/or cost of the head-mounted-display devices. In some embodiments, for example, the at least one position sensor may measure emissions from conventional display components, such as light emitted from display screens, thereby minimizing additional components required to perform the interpupillary distance determinations. Additionally, the disclosed apparatuses, systems, and methods may provide for smoother and finer adjustment of optical elements of head-mounted displays to accommodate various user interpupillary distances.

The following will provide, with reference to FIGS. 1-18, detailed descriptions of exemplary head-mounted-display systems and apparatuses for determining interpupillary distances of head-mounted displays. Additionally, the discussion corresponding to FIG. 19 will provide examples of methods for determining interpupillary distances of head-mounted displays. Moreover, the discussion corresponding to FIGS. 20A-21 will provide examples of systems and methods for calibrating a proximity sensor of a head-mounted display.

FIG. 1 is a perspective view of a head-mounted-display system 100 in accordance with some embodiments. In some embodiments, head-mounted-display system 100 may include a head-mounted-display device 102, a facial-interface system 108, a strap assembly 114, and audio subsystems 116. A head-mounted-display device may include any type or form of display device or system that is worn on or about a user's head and displays visual content to the user. Head-mounted-display devices may display content in any suitable manner, including via a screen (e.g., an LCD or LED screen), a projector, a cathode ray tube, an optical mixer, etc. Head-mounted-display devices may display content in one or more of various media formats. For example, a head-mounted-display device may display video, photos, and/or computer-generated imagery (CGI). Head-mounted-display device 102 may include a display housing 110 surrounding various components of head-mounted-display device 102, including a right-eye lens 104 and a left-eye lens 104 and various electronic components, including display components as described herein. Display housing 110 may include a housing back surface 112 and side surfaces surrounding the internal components, and a viewing opening 106 at a front side of display housing 110.

Head-mounted-display devices may provide diverse and distinctive user experiences. Some head-mounted-display devices may provide virtual-reality experiences (i.e., they may display computer-generated or pre-recorded content), while other head-mounted displays may provide real-world experiences (i.e., they may display live imagery from the physical world). Head-mounted displays may also provide any mixture of live and virtual content. For example, virtual content may be projected onto the physical world (e.g., via optical or video see-through), which may result in augmented reality or mixed reality experiences. Head-mounted-display devices may be configured to be mounted to a user's head in a number of ways. Some head-mounted-display devices may be incorporated into glasses or visors. Other head-mounted-display devices may be incorporated into helmets, hats, or other headwear. Examples of head-mounted-display devices may include OCULUS RIFT, GOOGLE GLASS, VIVE, SAMSUNG GEAR, etc.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

In some embodiments, audio subsystems 116 may be integrated with head-mounted-display device 102 and may provide audio signals to the user's ears in conjunction with or separate from displayed content. Head-mounted-display system 100 may, for example, have two audio subsystems 116 located on the left and right sides of head-mounted-display system 100 to provide audio signals to the user's left and right ears, as shown in FIG. 1.

Strap assembly 114 may be used for adjustably mounting head-mounted-display device 102 on the user's head. As shown in FIG. 1, strap assembly 114 may include lower straps and/or an upper strap that are coupled to head-mounted-display device 102 to adjustably conform to the top and/or sides of the user's head when the user is wearing head-mounted-display system 100. In some embodiments, strap assembly 114 may include a back piece coupled with the upper strap and lower straps to rest against the back of the user's head (e.g., around the user's occipital lobe). In at least one embodiment, the back piece may include an opening that is dimensioned and positioned to securely fit around a back portion (e.g., a portion of the user's occipital lobe) of the user's head.

In some embodiments, facial-interface system 108 may be configured to comfortably rest against a region of the user's face, including a region surrounding the user's eyes, when head-mounted-display system 100 is worn by the user. In these embodiments, facial-interface system 108 may include an interface cushion that is configured to rest against portions of the user's face (e.g., at least a portion of the user's nasal, cheek, temple, and/or forehead facial regions). Facial-interface system 108 may surround viewing opening 106, which includes the user's field of vision, allowing the user to look through lenses 104 of head-mounted-display device 102 without interference from outside light while the user is wearing head-mounted-display system 100.

In some embodiments, head-mounted-display device 102 may also include a light-blocking layer 118 surrounding lenses 104. Light-blocking layer 118 may, for example, extend between lenses 104 and surrounding portions of display housing 110. Light-blocking layer 118 may include, for example, a light-absorbing material (e.g., a dark polymeric and/or fabric material) that masks internal components of head-mounted-display device 102 and that prevents outside light incidentally entering viewing opening 106 (e.g., through a gap between the user's face and facial interface 108) from being reflected within viewing opening 106.

Figure 2:
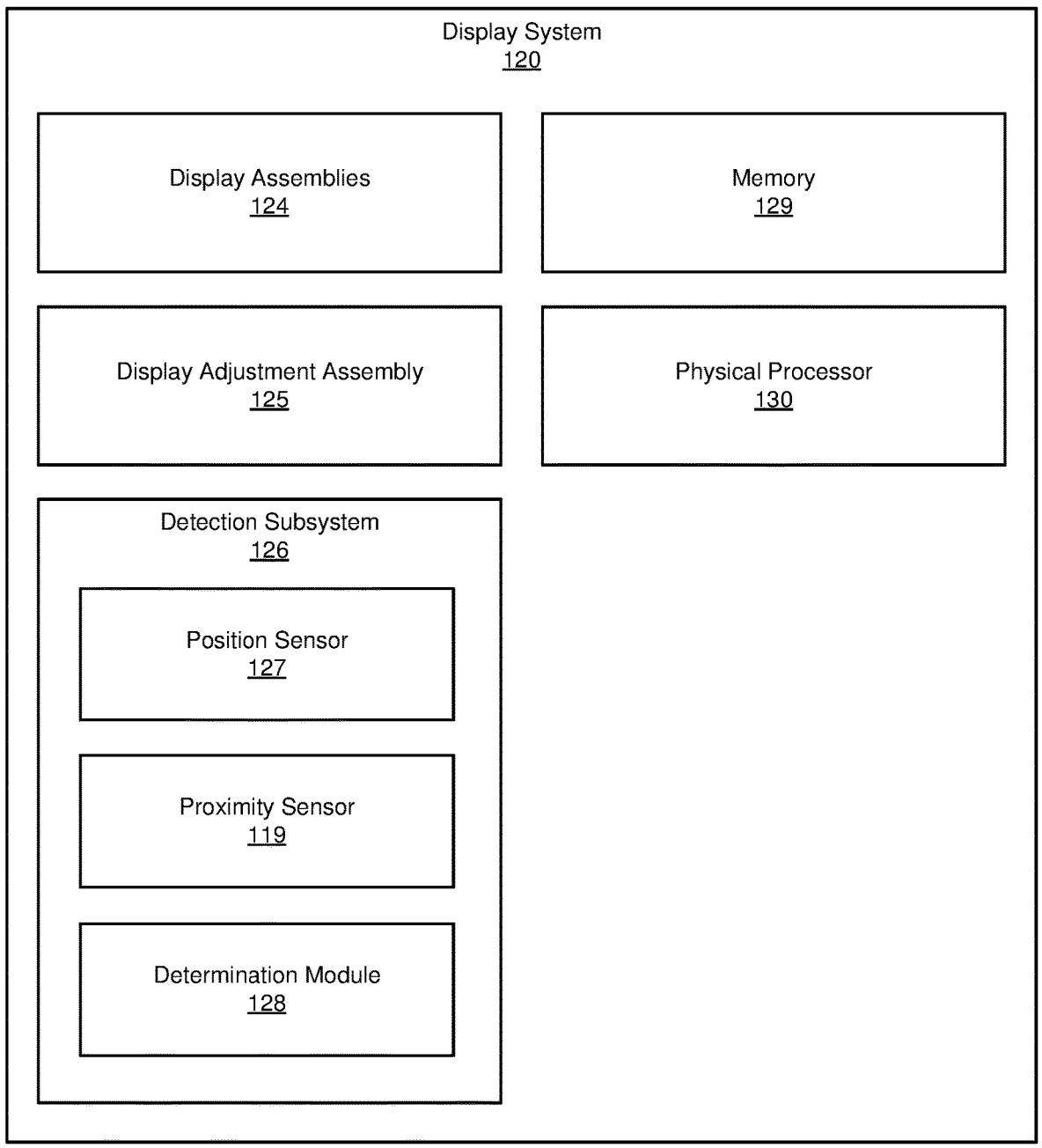
FIG. 2 is a block diagram of an exemplary display system in accordance with some embodiments.

FIG. 2 shows an exemplary display system 120 for determining interpupillary distances of head-mounted displays, such as head-mounted-display device 102 shown in FIG. 1. As shown in this figure, display system 120 may include one or more display assemblies 124, such as a pair of display assemblies 124 corresponding to a user's right and left eyes. Display assemblies 124 may be moveable within head-mounted-display device 102 to accommodate a plurality of user interpupillary distances. Each display assembly 124 may define a separate viewing region through which images are projected to a user's left or right eye. In some embodiments, display system 120 may include a display adjustment assembly 125 for adjusting a position of display assemblies 124 in any suitable manner.

Display system 120 may include a detection subsystem 126 for detecting one or more attributes of head-mounted-display device 102. Detection subsystem 126 may include at least one position sensor 127 for detecting a position of one or more of display assemblies 124. In some embodiments, detection subsystem 126 may include at least one proximity sensor 119 for detecting whether head-mounted-display device 102 is mounted on a user's head. Detection subsystem 126 may also include a determination module 128 that interfaces with at least one position sensor 127 and/or proximity sensor 119. For example, determination module 128 may send and/or receive signals from at least one position sensor 127 and/or proximity sensor 119 and may perform various functions based on the received signals.

In certain embodiments, determination module 128 of detection subsystem 126 may represent one or more software applications or programs that, when executed by a computing device, may cause the computing device to perform one or more tasks. For example, and as will be described in greater detail below, determination module 128 may represent a module stored and configured to run on a display device (e.g., head-mounted-display device 102) and/or one or more computing devices external to the display device. In one example, one more memory devices of the display device (e.g., memory 129) and/or one or more memory devices external to the display device may store, load, and/or maintain display-heating module.

In some embodiments, display system 120 may include one or more memory devices, such as memory 129. Memory 129 may be, for example, any type or form of volatile or non-volatile storage device or medium capable of storing data and/or computer-readable instructions. In one example, memory 129 may store, load, and/or maintain computer-readable instructions. Examples of memory 129 include, without limitation, embedded multimedia cards, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

Display system 120 may also include a physical processor 130. Physical processor 130 may be, for example, any type or form of physical hardware-implemented processing unit capable of interpreting and/or executing computer-readable instructions. In one example, physical processor 130 may access and/or modify one or more instructions stored in memory (e.g., memory 129). Examples of physical processor 130 include, without limitation, microprocessors, microcontrollers, embedded processors, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Figure 3A:
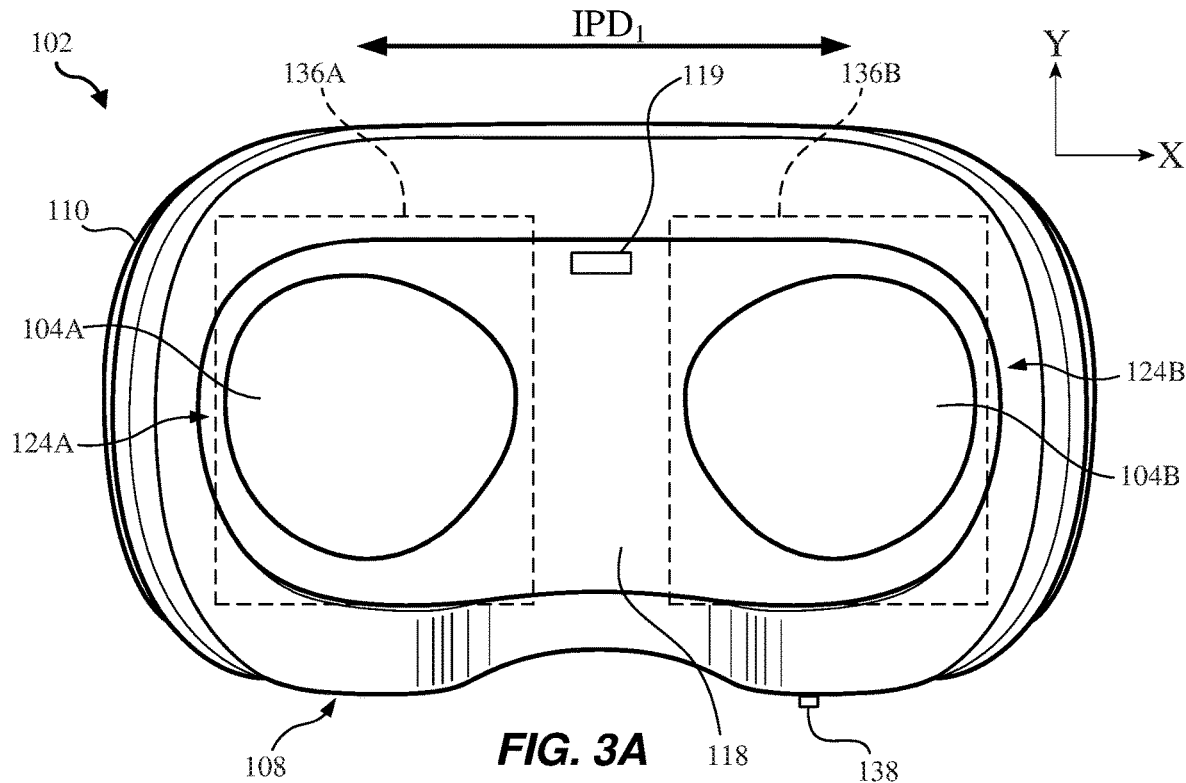
FIGS. 3A and 3B are front views of an exemplary head-mounted-display device in accordance with some embodiments.
Figure 3B:
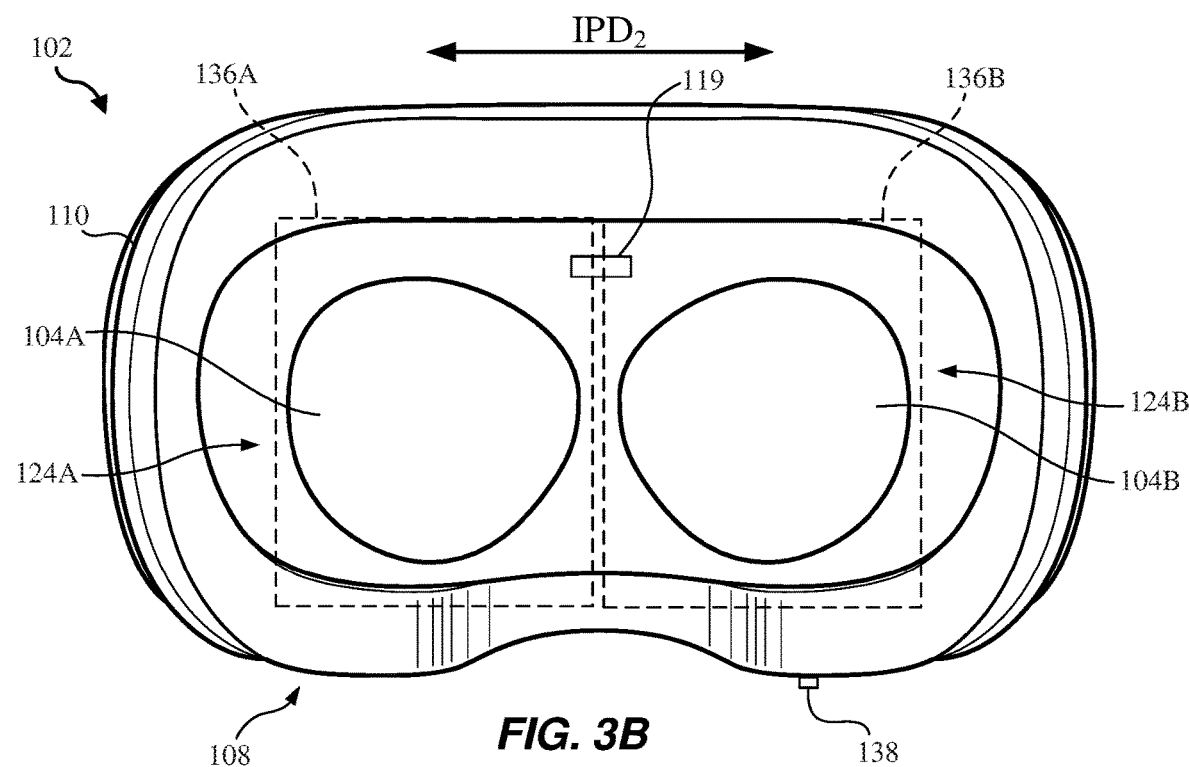

FIGS. 3A and 3B show front views of head-mounted-display device 102 including a left-eye assembly 124A and a right-eye assembly 124B disposed within display housing 110. As shown in FIGS. 3A and 3B, left- and right-eye display assemblies 124A and 124B may respectively include left- and right-eye lenses 104A and 104B and left- and right-eye display screens 136A and 136B. Left- and right-eye lenses 104A and 104B may respectively overlap left- and right-eye display screens 136A and 136B such that images produced by display regions of left- and right-eye display screens 136A and 136B are visible to a user through left- and right-eye lenses 104A and 104B. In some embodiments, as will be described in greater detail below, left- and right-eye display assemblies 124A and 124B may also include eye cups and/or other light-blocking and/or dividing members surrounding and/or separating left- and right-eye viewing regions. Such a configuration may enable distinct images to be presented by left- and right-eye display screens 136A and 136B to each of the user's left and right eyes, allowing for three-dimensional images to perceived by the user. While two display screens are illustrated in FIGS. 3A and 3B, in some embodiments, head-mounted-display devices may include any suitable number of display screens, such as, for example, a single display screen having separate regions that are visible to a user's left and right eyes.

Left- and right-eye display screens 136A and 136B may each include a plurality of pixels and sub-pixels that form visible images according to any suitable display technology. Left- and right-eye display screens 136A and 136B may be any suitable type of display screen, such as an LCD screen (e.g., a backlit LCD screen), an LED screen (e.g., an active-matrix organic LED (AMOLED) screen), a plasma display screen, an electrophoretic display screen, an electrowetting display screen, a cathode ray display screen, and/or any other suitable type of image display screen. Light may be emitted from display surfaces of left- and right-eye display screens 136A and 136B such that displayed images are visible to a user. In some examples, images may be produced by driving sub-pixels of the display screens at different currents and/or voltages such that different amounts of light are emitted from each of the sub-pixels.

Display housing 110 may include a rigid or semi-rigid material, such as a polymeric material, that supports and protects internal components of head-mounted-display device 102. At least a portion of display housing 110, such as a portion of display housing 110 surrounding viewing opening 106, may include a light-absorbing material that prevents passage of external light and prevents reflection of light incidentally entering viewing opening 106. Blocking external light and/or preventing reflection of light in viewing opening 106 of head-mounted-display device 102 may greatly enhance a user's immersive viewing experience by ensuring that nearly all light visible to the user is image light emitted from left- and right-eye display screens 136A and 136B. In some embodiments, head-mounted-display device 102 may also include a proximity sensor 119 for detecting when head-mounted-display device 102 is positioned on a user's face. For example, proximity sensor 119 may be disposed near an upper portion of display housing 110 corresponding to a user's forehead region.

FIGS. 3A and 3B illustrate left- and right-eye display assemblies 124A and 124B positioned to accommodate different user interpupillary distances (i.e., a distance between the centers of the pupils of a user's eyes). Interpupillary distances typically differ from user to user, and left- and right-eye display assemblies 124A and 124B may be adjustable to accommodate a range of interpupillary distances. Left- and right-eye display assemblies 124A and 124B may be adjusted using any suitable display adjustment mechanism (see, e.g., display adjustment assembly 125 shown in FIG. 2). In at least one example, a position of left-eye display assembly 124A and/or right-eye display assembly 124B may be adjusted by a user using, for example, a slidable adjustment protrusion 138 and/or any other suitable adjustment member to move the left-eye display assembly 124A and/or right-eye display assembly 124B in a direction parallel to the X-axis shown in FIG. 3A. Such a display adjustment mechanism may have a plurality of set positions for left- and right-eye display assemblies 124A and 124B and/or may be a continuously variable adjustment mechanism. Left- and right-eye display assemblies 124A and 124B may be centered with respect to a region midway between a user's eyes and may move toward or away from each other in linear and/or radial directions such that left- and right-eye display assemblies 124A and 124B remain centered with respect to the user's field of view during adjustment. Left- and right-eye display assemblies 124A and 124B may be adjusted by a user such that left- and right-eye display assemblies 124A and 124B are optimally positioned in front of a user's pupils, providing the user with an ideal viewing experience.

FIG. 3A shows left- and right-eye display assemblies 124A and 124B adjusted to fit a user having a first interpupillary distance $IPD_1$. FIG. 3B shows left- and right-eye display assemblies 124A and 124B adjusted to fit a user having a second interpupillary distance $IPD_2$, which is narrower than first interpupillary distance $IPD_1$ shown in FIG. 3A. As illustrated in these figures, left- and right-eye display assemblies 124A and 124B are disposed relatively further apart to accommodate interpupillary distance $IPD_1$ and are disposed relatively closer together to accommodate interpupillary distance $IPD_2$. Left- and right-eye display assemblies 124A and 124B may be disposed at any other suitable positions to accommodate various other user interpupillary distances, without limitation.

Figure 4:
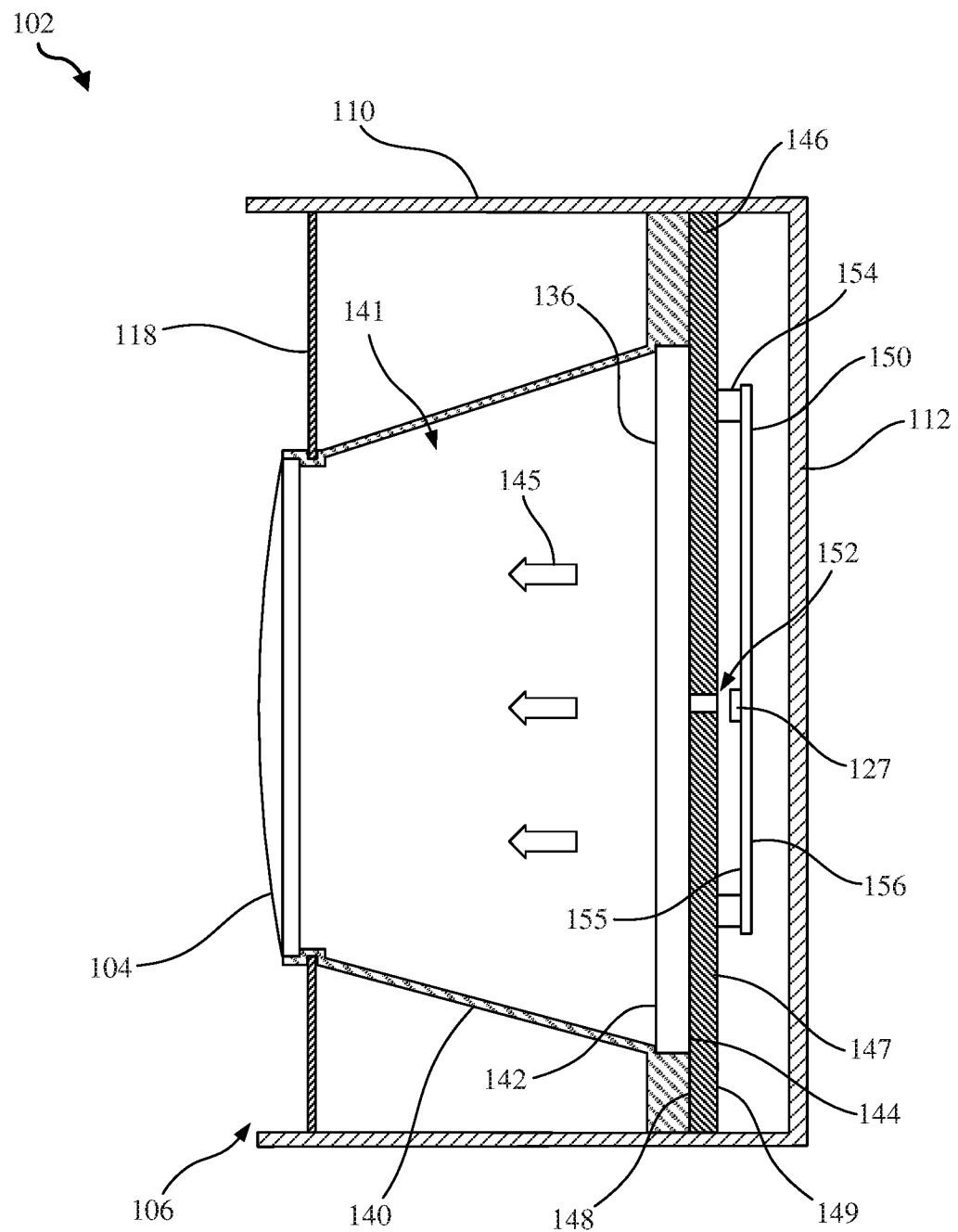
FIG. 4 is a cross-sectional side view of an exemplary head-mounted-display device in accordance with some embodiments.

FIG. 4 shows an exemplary partial cross-sectional side view of head-mounted-display device 102. This figure illustrates a display assembly 124 (i.e., left-eye display assembly 124A or right-eye display assembly 124B shown in FIGS. 3A and 3B) disposed within display housing 110. Each display assembly 124 may include a display screen 136 and an eye cup 140. A lens 104 may be mounted to eye cup 140, which may extend between lens 104 and display screen 136. In some embodiments, eye cup 140 may surround a viewing region 141 between lens 104 and display screen 136. Display screen 136 may be positioned and oriented such that a front surface 142 of display screen 136 faces toward lens 104. As such, image light 145 emitted from front surface 142 of display screen 136 may be visible to a user through lenses 104.

According to at least one embodiment, a back surface 144 of display screen 136 and a rear portion of eye cup 140 may be disposed adjacent to a support assembly 146. For example, as shown in FIG. 4, back surface 144 of display screen 136 may be disposed adjacent to a front surface 148 of a dividing member 147 of support assembly 146. In some embodiments, support assembly 146 may be mounted to display housing 110. Each display assembly 124 (e.g., left-eye display assembly 124A and right-eye display assembly 124B shown in FIGS. 3A and 3B) may be movably supported within display housing 110 such that each display assembly 124 is movable with respect to support assembly 146, enabling adjustment of each display assembly 124 to accommodate various user interpupillary distances.

In certain embodiments, one or more electronic components may be located near at least a portion of display screen 136. For example, as shown in FIG. 4, a printed circuit board 150 that includes and/or that is coupled to at least one electronic component (e.g., a processing device, a memory device, a power management device, a communication device, etc.) may be located near and/or adjacent to a back surface 149 of dividing member 147 in a portion of display housing 110 between display screen 136 and housing back surface 112. In some embodiments, printed circuit board 150 may be mounted to support assembly 146 by at least one mounting member 154 such that a front surface 155 of printed circuit board 150 is separated from dividing member 147 by a selected distance. A back surface 156 of printed circuit board 150 may face toward housing back surface 112 of display housing 110.

According to some embodiments, at least one position sensor of a detection subsystem 126 (see FIG. 2) may be positioned near and/or adjacent to at least a portion of display assembly 124. For example, as illustrated in FIG. 4, at least one position sensor 127 may be positioned on front surface 155 of printed circuit board 150 near back surface 144 of display screen 136 and/or near back surface 149 of dividing member 147. Additionally or alternatively, at least one position sensor 127 may be disposed in any suitable portion of head-mounted-display device 102, without limitation. In some examples, as will be described in greater detail below, position sensor 127 may be an optical sensor that receives light emitted from a tracked region of display assembly 124. For example, a dividing-member opening 152 may be defined in dividing member 147, allowing for passage of light from a tracked region of display screen 136. Dividing member 147 may, for example, include a light-blocking material that prevents or inhibits passage of light other than light passing through dividing-member opening 152. Light passing through dividing-member opening 152 of dividing member 147 may be received by position sensor 127 to enable detection of a position of display assembly 124 and determination of a corresponding interpupillary distance. In some embodiments, one or more optical elements (e.g., a filter, a collimator, a focusing element, etc.) may be disposed between display screen 136 and position sensor 127. For example, an optical element may overlap and/or may be disposed within at least a portion of dividing-member opening 152 to modify light emitted from display screen 136.

Figure 5:
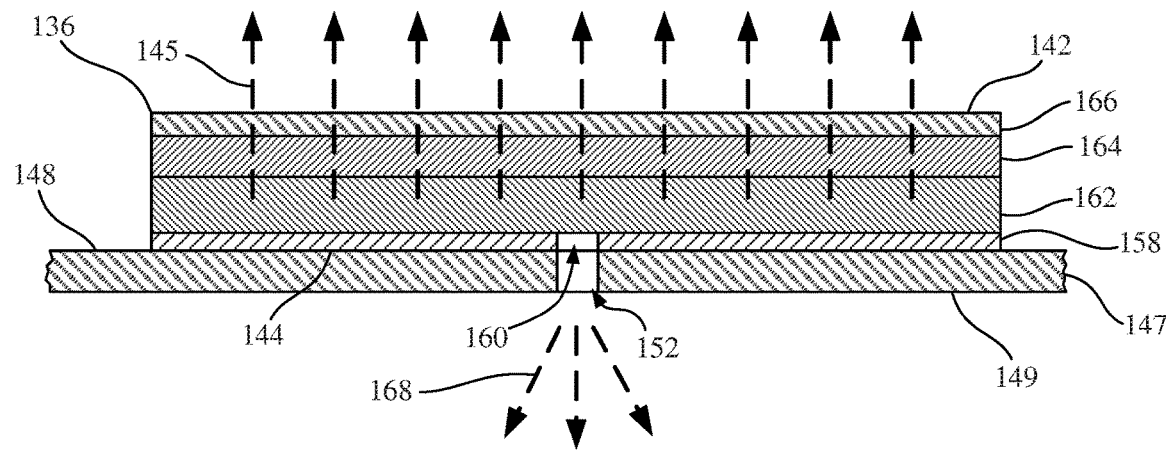
FIG. 5 is a cross-sectional side view of an exemplary display screen and a portion of a dividing member in accordance with some embodiments.

FIG. 5 is a cross-sectional view of an exemplary display screen 136 and a portion of dividing member 147 positioned adjacent to display screen 136. As shown in this figure, display screen 136 may include a back light-blocking layer 158 formed at a backside of display screen 136. Back light-blocking layer 158 may form back surface 144 and may include any suitable material that blocks and/or reflects light, such as, for example, a metallic material. In some examples, a tracking opening 160 may be formed in a portion of back light-blocking layer 158 corresponding to a tracked region of display screen 136. Display screen 136 may include a backlight unit 162, which is disposed adjacent to back light-blocking layer 158, and a light-modulating layer 164 for modulating light to produce an image that is visible to a user's eye. Backlight unit 162 may include any suitable components and/or materials for generating and/or directing light. In at least one embodiment, backlight unit 162 may include a light source, such as a side-emitting LED array or a cold cathode fluorescent lamp (CCFL). Backlight unit 162 may also include features for directing light from the light source toward portions of light-modulating layer 164, such as a light guide, a diffuser, a brightness enhancement film, and/or any other suitable lighting elements. Back light-blocking layer 158 may reflect light within backlight unit 162 and/or toward light-modulating layer 164 such that light is evenly transmitted to light-modulating layer 164.

In various embodiments, light-modulating layer 164 may include a liquid crystal layer and a thin-film transistor (TFT) array forming a plurality of pixel and sub-pixel regions. A display driver may be electrically coupled to the TFT array to modulate the amount of light passing through each of the sub-pixel regions. A cover layer 166 forming front surface 142 may be disposed on light-modulating layer 164. Cover layer 166 may include a transparent cover formed of, for example, glass, a transparent polymer, and/or any other suitable material. Display screen 136 may include any other suitable layers and/or components, including, for example, one or more polarizers, a color filter, and/or a prism film (e.g., a brightness enhancement film).

According to at least one embodiment, at least a portion of tracking opening 160 defined in back light-blocking layer 158 may overlap at least a portion of dividing-member opening 152 defined in dividing member 147. Accordingly, a portion of light from backlight unit 162 of display screen 136 may pass through overlapping regions of tracking opening 160 and dividing-member opening 152 and may be emitted as rearward-emitted light 168. Rearward-emitted light 168 may be emitted in various directions toward a region disposed behind dividing member 147, such as toward printed circuit board 150 shown in FIG. 4. As will be described in greater detail below, rearward-emitted light 168 may be utilized by one or more optical sensors to determine a position of display screen 136.

Figure 6:
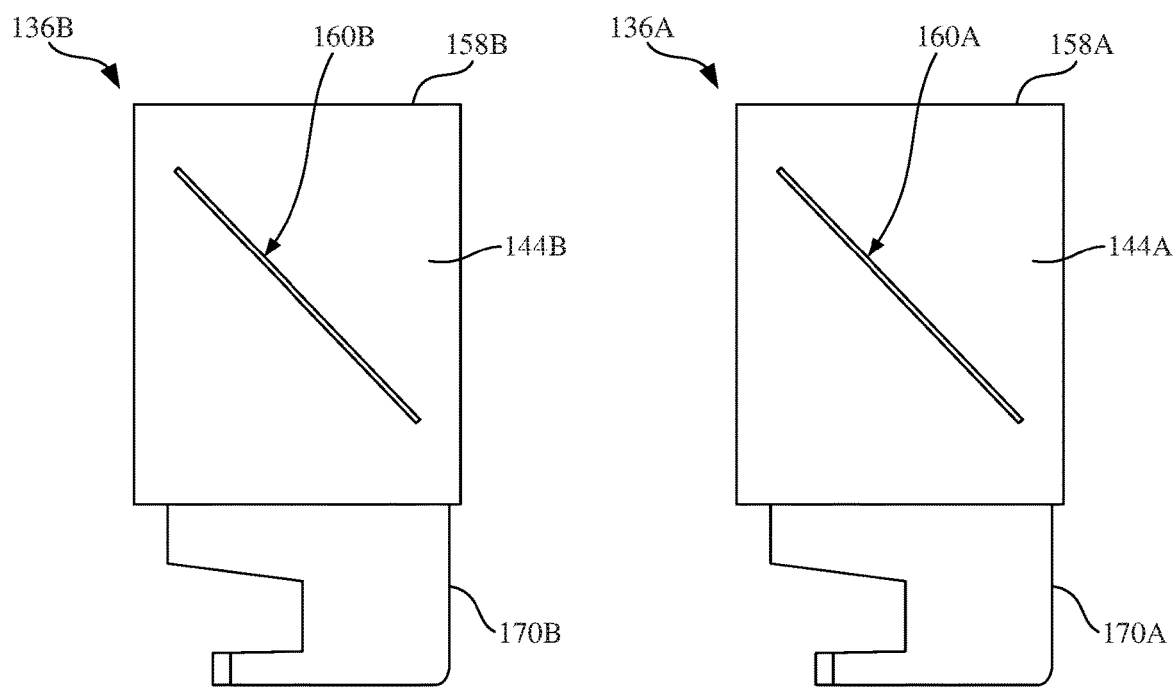
FIG. 6 is a rear view of exemplary left- and right-eye display screens in accordance with some embodiments.

FIG. 6 shows rear views of left- and right-eye display screens 136A and 136B coupled to corresponding connectors. As illustrated in this figure, left- and right-eye display screens 136A and 136B may be electrically coupled to a connector 170A and a connector X170B, respectively. In at least one example, connectors 170A and 170B may include any suitable type of connector for transmitting power and/or data to left- and right-eye display screens 136A and 136B. For example, connectors 170A and 170B may represent ribbon cables that provide power and data to left- and right-eye display screens 136A and 136B. In some examples, connectors 170A and 170B may electrically couple left- and right-eye display screens 136A and 136B to one or more display subsystems and/or power supplies. In some examples, connectors 170A and 170B may include a flexible material and may be dimensioned to provide sufficient slack to maintain electrical connections as left- and right-eye display screens 136A and 136B move within head-mounted-display device 102.

Figure 7:
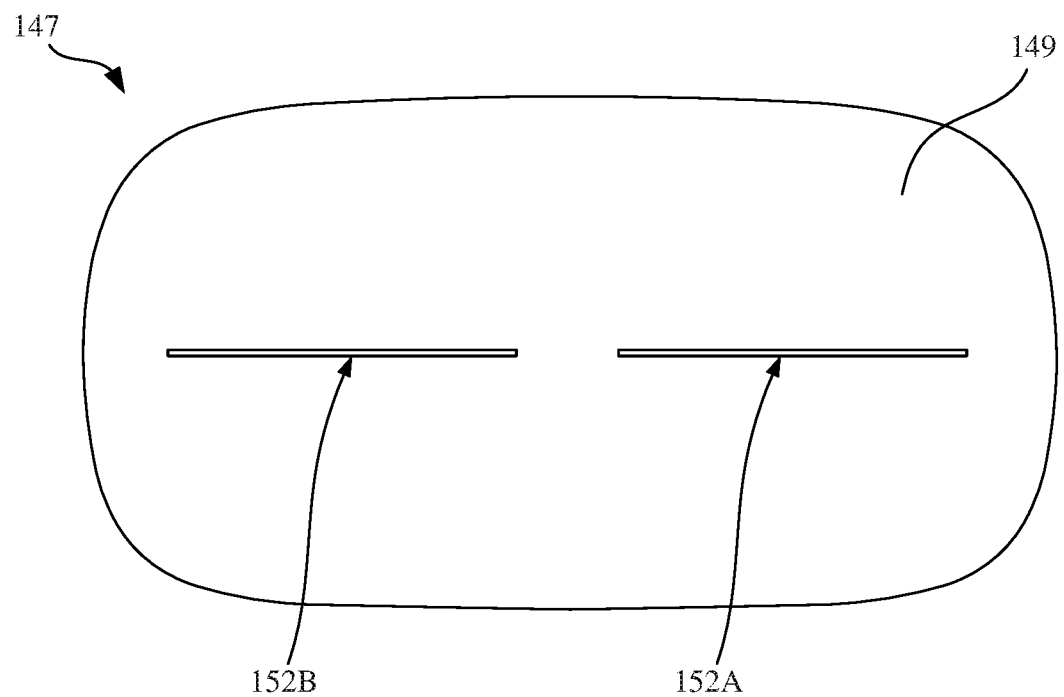
FIG. 7 is a rear view of an exemplary dividing member in accordance with some embodiments.

Tracking openings 160A and 160B respectively defined in back light-blocking layers 158A and 158B of left- and right-eye display screens 136A and 136B may be any suitable shape and size, without limitation. Tracking openings 160A and 160B may emit light generated by left- and right-eye display screens 136A and 136B toward one or more dividing members (e.g., dividing member 147) disposed adjacent to back surfaces 144A and 144B of left- and right-eye display screens 136A and 136B. The shape and size of each of tracking openings 160A and 160B may be selected such that least a portion of each of tracking openings 160A and 160B overlaps one or more openings (e.g., dividing-member opening 152 shown in FIG. 5) defined in a dividing member 147 overlapping tracking openings 160A and 160B. For example, each of tracking openings 160A and 160B may be a longitudinally extending slit configured to overlap corresponding openings defined in dividing member 147. Tracking openings 160A and 160B may extend diagonally (e.g., obliquely relative to one or more peripheral sides of left- and right-eye display screens 136A and 136B), as shown in FIG. 6, and/or in any other suitable directions. Although tracking openings 160A and 160B are illustrated as linearly extending slits, tracking openings 160A and 160B may additionally or alternatively extend in any other suitable directions. For example, tracking opening 160A and/or tracking opening 160B may extend arcuately and/or may extend in multiple different directions (e.g., along an undulating path, a zig-zag path, etc.). While tracking openings 160A and 160B are illustrated as extending in substantially the same directions with respect to left- and right-eye display screens 136A and 136B, tracking openings 160A and 160B may each extend in different directions in some embodiments. Additionally or alternatively, tracking opening 160A and/or tracking opening 160B may have a shape (e.g., a geometric shape or a non-geometric shape) that does not extend longitudinally. In some embodiments, a plurality of tracking openings may be defined in back light-blocking layer 158A and/or may be defined in back light-blocking layer 158B of left- and right-eye display screens 136A and/or 136B FIG. 7 shows a rear view of an exemplary dividing member 147 according to various embodiments. As shown in this figure, dividing-member openings 152A and 152B may be defined in dividing member 147. Dividing-member openings 152A and 152B may respectively correspond to tracking openings 160A and 160B defined in left- and right-eye display screens 136A and 136B. Each of dividing-member openings 152A and 152B may pass through dividing member 147 from front surface 148 (see FIG. 4) to back surface 149 such that light from at least a portion of each of tracking openings 160A and 160B respectively passes through an adjacent portion of each of dividing-member openings 152A and 152B. The shape and size of each of dividing-member openings 152A and 152B may be selected such that tracking openings 160A and 160B defined in left- and right-eye display screens 136A and 136B respectively overlap different regions of dividing-member openings 152A and 152B as the positions of left- and right-eye display screens 136A and 136B are changed with respect to dividing member 147.

In some embodiments, each of dividing-member openings 152A and 152B may be a longitudinally extending slit extending horizontally (i.e., in a direction parallel to the X-axis illustrated in FIG. 3A), as shown in FIG. 7, and/or in any other suitable directions. Additionally or alternatively, a single dividing-member opening configured to overlap both of tracking openings 160A and 160B defined in left- and right-eye display screens 136A and 136B may be defined in dividing member 147. In some embodiments, on or more dividing-member openings, in addition to dividing-member openings 152A and 152B shown in FIG. 7, may be defined in dividing member 147. Although dividing-member openings 152A and 152B are illustrated as linearly extending slits, dividing-member openings 152A and 152B may additionally or alternatively extend in any other suitable directions. For example, dividing-member opening 152A and/or dividing-member opening 152B may extend arcuately and/or may extend in multiple different directions (e.g., along an undulating path, a zig-zag path, etc.). While dividing-member openings 152A and 152B are illustrated as extending in substantially the same directions with respect to dividing member 147, dividing-member openings 152A and 152B may each extend in different directions in some embodiments.

Figure 8:
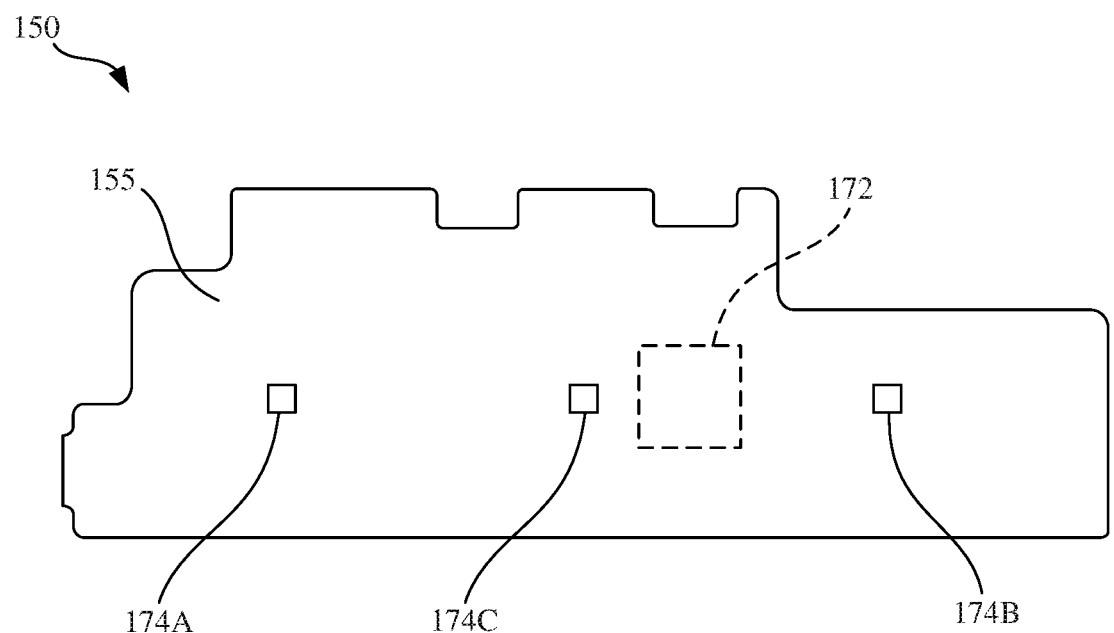
FIG. 8 is a front view of an exemplary printed circuit board and a plurality of mounted optical sensors in accordance with some embodiments.

FIG. 8 shows a front view of an exemplary printed circuit board 150 in accordance with at least one embodiment. Various electronic components, such as a microcontroller unit 172, may be mounted on printed circuit board 150. In some embodiments, one or more sensors for tracking positions of left- and right-eye display screens 136A and 136B may also be mounted on printed circuit board 150. For example, as shown in FIG. 8, optical sensors 174A, 174B, and 174C may be mounted on front surface 155 of printed circuit board 150 such that optical sensors 174A, 174B, and 174C face toward dividing member 147, left-eye display screen 136A, and right-eye display screen 136B. Any suitable number of optical sensors may be mounted on printed circuit board 150 in any suitable positions. Additionally or alternatively, one or more optical sensors may be mounted on in any suitable portions of head-mounted-display device 102 other than printed circuit board 150, without limitation. In at least one example, optical sensors 174A, 174B, and/or 174C may be aligned or substantially aligned in a horizontal direction (i.e., in a direction parallel to the X-axis illustrated in FIG. 3A) such that optical sensors 174A, 174B, and/or 174C are aligned along a direction of movement of left- and right-eye display screens 136A and 136B with respect to printed circuit board 150. In some examples, one or more of optical sensors 174A, 174B, and/or 174C not be horizontally aligned in the manner shown in FIG. 8.

Figure 9A:
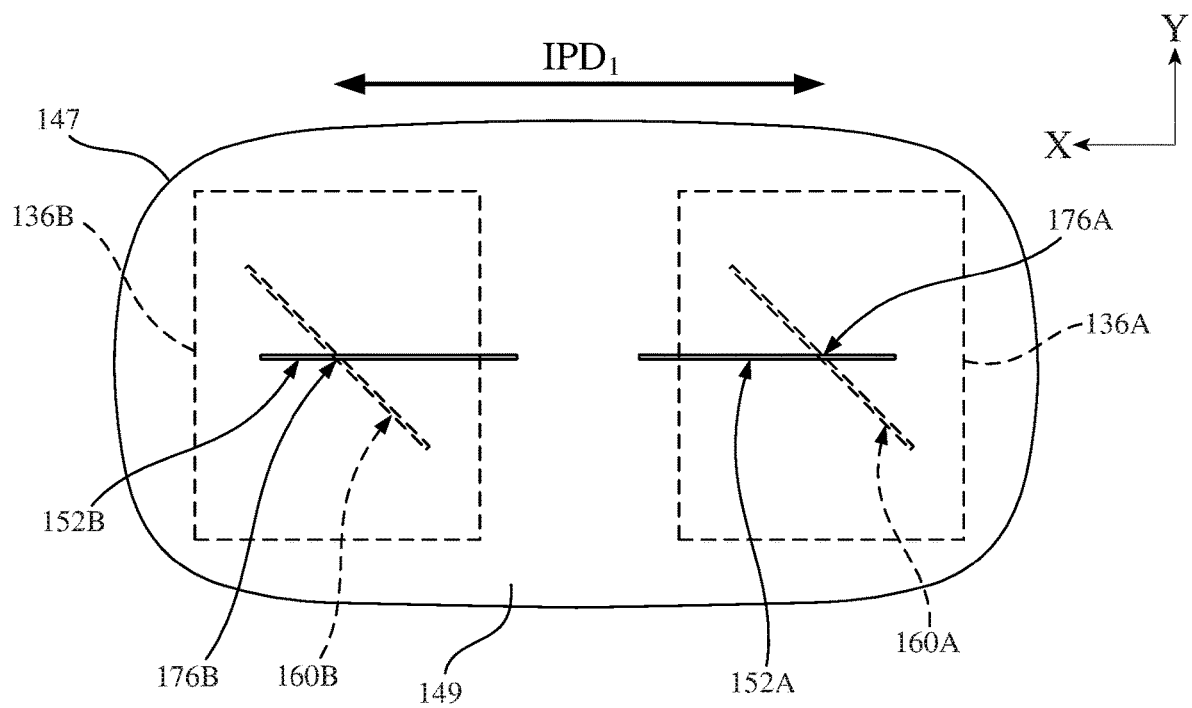
Figure 8B:
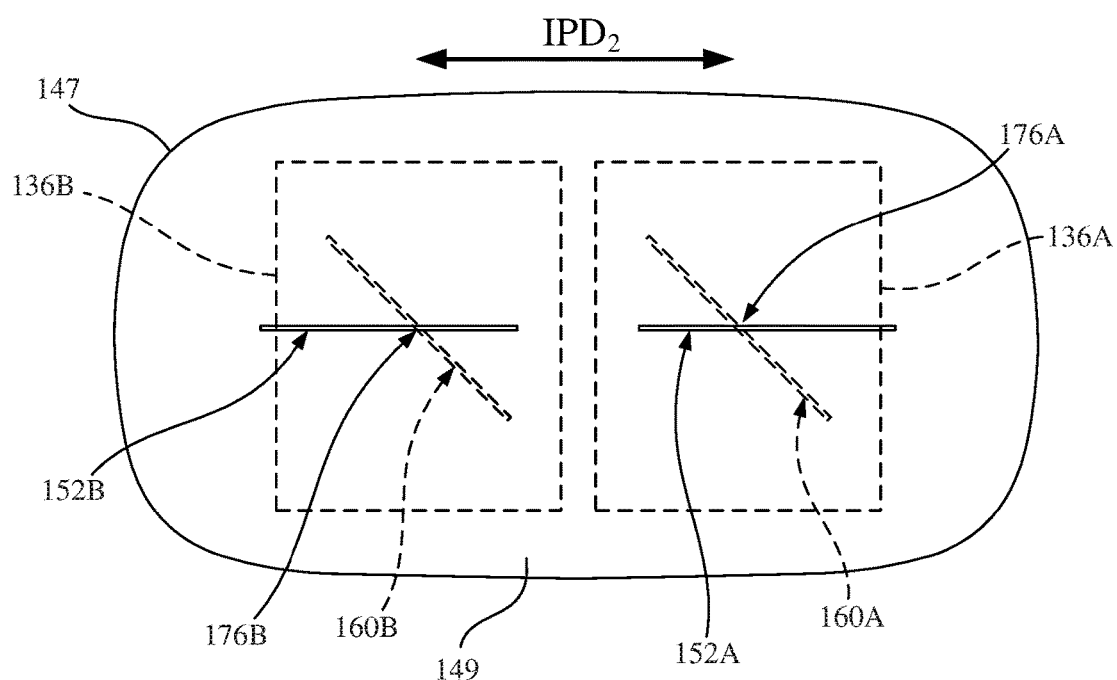

FIGS. 9A and 9B illustrate exemplary positions of left- and right-eye display screens 136A and 136B with respect to dividing member 147 within head-mounted-display device 102. As shown in these figures, tracking openings 160A and 160B defined in back portions of left- and right-eye display screens 136A and 136B may respectively overlap dividing-member openings 152A and 152B defined in dividing member 147. For example, tracking openings 160A and 160B may overlap dividing-member openings 152A and 152B at overlapping opening regions 176A and 176B, respectively. Because portions of tracking openings 160A and 160B other than overlapping opening regions 176A and 176B are occluded by dividing member 147, light from left- and right-eye display screens 136A and 136B may be prevented or inhibited from passing beyond back surface 149 of dividing member 147 through regions outside of overlapping opening regions 176A and 176B.

In some embodiments, as left- and right-eye display screens 136A and 136B move within head-mounted-display device 102 (e.g., in directions parallel to the X-axis shown in FIGS. 9A and 9B) with respect to dividing member 147, positions of overlapping opening regions 176A and 176B may also move as the positions of tracking openings 160A and 160B change with respect to dividing-member openings 152A and 152B. Accordingly, the profile of light transmitted from left- and right-eye display screens 136A and 136B through dividing member 147 to one or more optical sensors (e.g., optical sensors 174A, 174B, and/or 174C illustrated in FIG. 8) may vary depending on positions of left- and right-eye display screens 136A and 136B. For example, FIG. 9A shows left- and right-eye display screens 136A and 136B disposed at a position corresponding to a user having an interpupillary distance $IPD_1$ and FIG. 9B shows left- and right-eye display screens 136A and 136B disposed closer together at a position corresponding to a user having an interpupillary distance $IPD_2$. Accordingly, overlapping opening regions 176A and 176B shown in FIG. 9B are disposed closer together than overlapping opening regions 176A and 176B shown in FIG. 9A.

FIGS. 10A and 10B, which respectively correspond to FIGS. 9A and 9B, show top cross-sectional views of left-eye display screen 136A, right-eye display screen 136B, dividing member 147, and printed circuit board 150. In at least one embodiment, when left- and right-eye display screens 136A and 136B are disposed at the position corresponding to a user having an interpupillary distance $IPD_1$ shown in FIG. 10A, overlapping opening region 176A may be positioned in relatively closer proximity to optical sensor 174A, and overlapping opening region 176B may be positioned in relatively closer proximity to optical sensor 174B. Alternatively, in comparison to the configuration shown in FIG. 10A, when left- and right-eye display screens 136A and 136B are disposed at the position corresponding to a user having an interpupillary distance $IPD_2$, overlapping opening region 176A may be positioned further from optical sensor 174A and closer to optical sensor 174C, and overlapping opening region 176B may be positioned further from optical sensor 174B and closer to optical sensor 174C, as shown in FIG. 10B.

Accordingly, the amounts of light respectively received at each of optical sensors 174A, 174B, and 174C may differ in each of the configurations illustrated in FIGS. 10A and 10B. For example, as shown in FIG. 10A, in response to rearward emitted light 168A emitted from left-eye display screen 136A and rearward emitted light 168B emitted from right-eye display screen 136B, optical sensors 174A, 174B, and 174C may respectively measure luminance values of $L_{V1}$, $L_{V2}$, and $L_{V3}$. Alternatively, as shown in FIG. 10B, in response to rearward emitted light 168A emitted from left-eye display screen 136A and rearward emitted light 168B emitted from right-eye display screen 136B, optical sensors 174A, 174B, and 174C may respectively measure luminance values of $L_{V1'}$, $L_{V2'}$, and $L_{V3'}$.

Any suitable technique may be utilized to correlate the amounts of light received by optical sensors 174A, 174B, and 174C to the respective positions of left- and right-eye display screens 136A and 136B and/or to a user's interpupillary distance. In at least one embodiment, determination module 128 shown in FIG. 2 may correlate a luminance of light detected by each of optical sensors 174A, 174B, and 174C to positions of left- and right-eye display screens 136A and 136B and/or to an interpupillary distance according to the following equation:

$$d_{IPD} = c * \frac{2(l_{V3} - L_{V3} - b)}{(l_{V1} - L_{V1} - b) + (l_{V2} - L_{V2} - b)}$$

where $d_{IPD}$ is the interpupillary distance corresponding to the positions of left- and right-eye display screens 136A and 136B and $L_{V1}$, $L_{V2}$, and $L_{V3}$ are luminance values measured respectively measured by optical sensors 174A, 174B, and 174C. Additionally, $I_{V1}$, $I_{V2}$, and $I_{V3}$ in the above equation are respectively amounts of feedback respectively determined for each of optical sensors 174A, 174B, and 174C when head-mounted-display device 102 is turned on. Further, in relation to the above equation, $(I_{V1}-b)$ is equal to an amount of feedback determined for optical sensor 174A, $(I_{V2}-b)$ is equal to an amount of feedback determined for optical sensor 174B, and $(I_{V3}-b)$ is equal to an amount of feedback determined for optical sensor 174C when head-mounted-display device 102 is turned off. Moreover, c in the above equation is a coefficient parameter that is particular to a temperature measured in at least a portion of head-mounted-display device 102 (for example, c may be factory calibrated for each individual head-mounted-display device 102 over a range of temperatures). Although FIGS. 10A and 10B illustrate optical sensors 174A, 174B, and 174C that may detect positions of both left-eye display screen 136A and right-eye display screen 136B, in some embodiments, one or more optical sensors may detect a position of a single on of left- and right-eye display screens 136A and 136B. In at least one example, a position of one of left-eye display screen 136A and right-eye display screen 136B may be determined, and the position of the other of left-eye display screen 136A and right-eye display screen 136B may be deduced based on the determined position.

FIGS. 11A-12C illustrate various exemplary configurations of display screens and dividing members. Openings defined in back portions of display screens and openings defined in dividing members of head-mounted-display devices may have any suitable shapes, sizes, and or configurations, without limitation. Optical sensors for detecting light emitted from the display screens shown in FIGS. 11A-12C may have any suitable configuration, such the configuration illustrated in FIG. 8 and/or any other suitable configuration, without limitation.

Figure 11A:
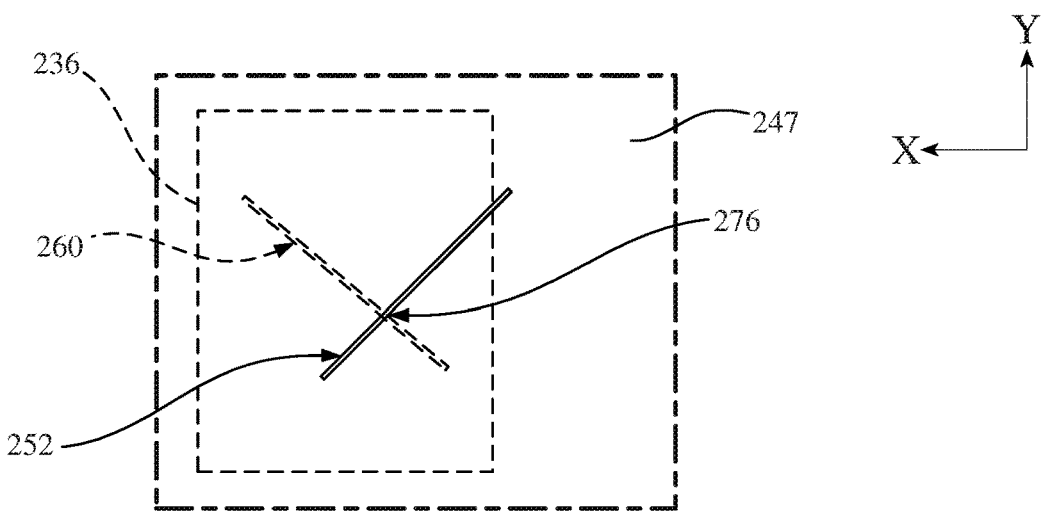
FIGS. 11A-11C are rear views of exemplary left- and right-eye display screens and an exemplary dividing member in accordance with some embodiments.
Figure 11B:
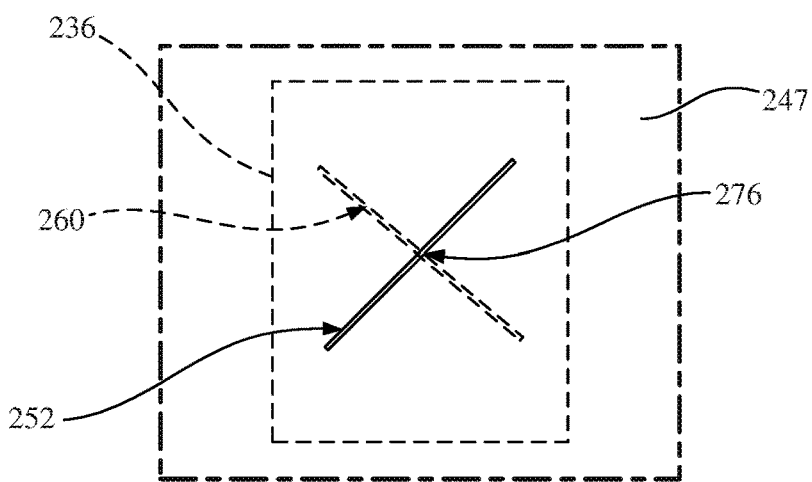
Figure 11C:
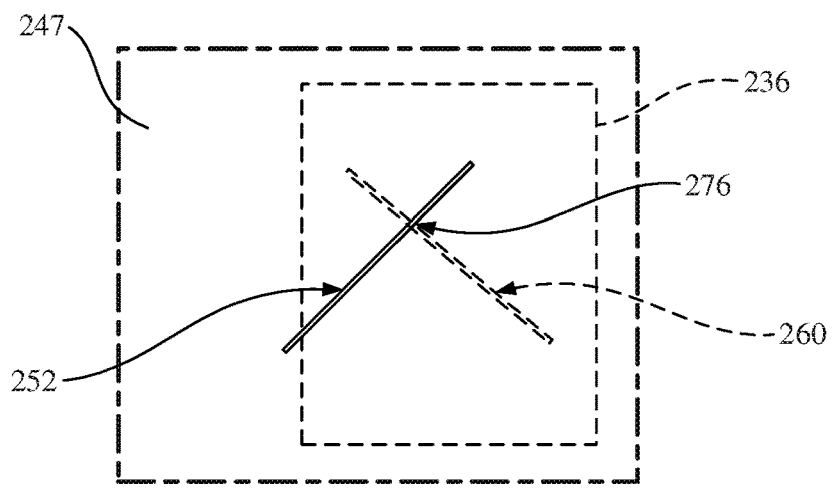

FIGS. 11A-11C show rear views of a display screen 236 (e.g., a left-eye display screen or a right-eye display screen) and a portion of a dividing member 247 of an exemplary head-mounted-display device overlapping display screen 236. Display screen 236 may be movable with respect to dividing member 247 in a direction parallel to the illustrated X-axis. As shown in these figures, a tracking opening 260 defined in display screen 236 may extend obliquely relative to the direction of movement of display screen 236. Additionally, a dividing-member opening 252 defined in dividing member 247 may extend obliquely in another direction relative to the direction of movement of display screen 236.

As shown in FIG. 11A, tracking opening 260 may overlap dividing-member opening 252 at an overlapping opening region 276, through which rearward emitted light from display screen 236 may pass. As shown in FIG. 11B, when display screen 236 is moved to a second position in a direction parallel to the X-axis, overlapping opening region 276 may be shifted diagonally with respect to the X-axis and the Y-axis. Additionally, as shown in FIG. 11C, when display screen 236 is moved to a third position in a direction parallel to the X-axis, overlapping opening region 276 may be further shifted diagonally with respect to the X-axis in the Y-axis.

Figure 12A:
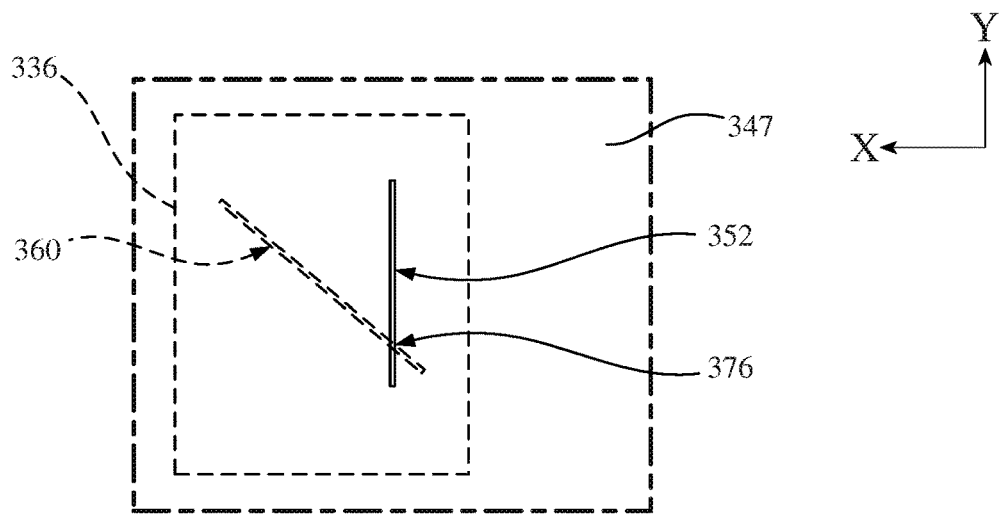
FIGS. 12A-12C are rear views of exemplary left- and right-eye display screens and an exemplary dividing member in accordance with some embodiments.
Figure 12B:
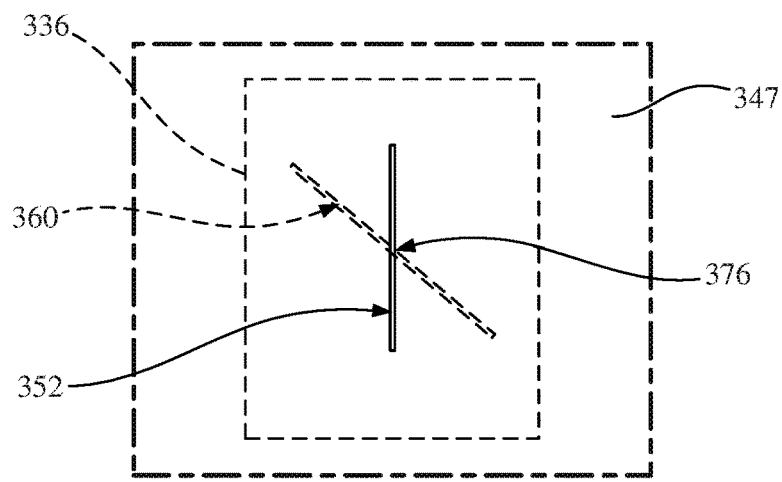
Figure 12C:
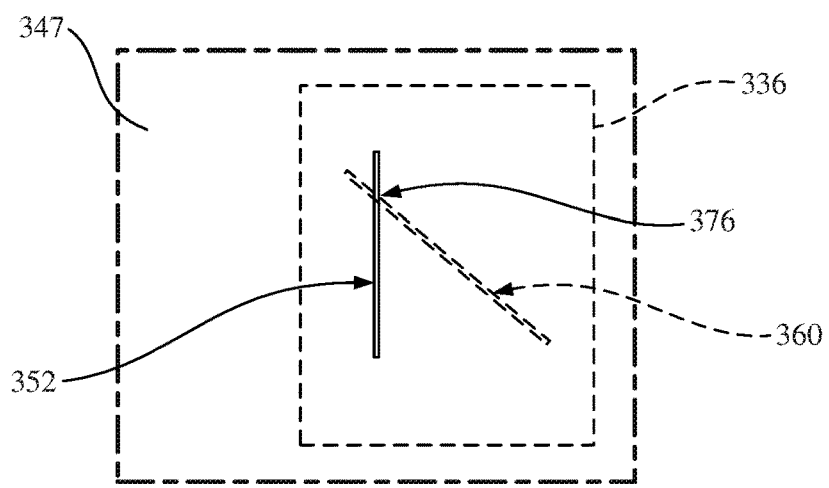

FIGS. 12A-12C show rear views of a display screen 336 (e.g., a left-eye display screen or a right-eye display screen) and a portion of a dividing member 347 of an exemplary head-mounted-display device overlapping display screen 336. Display screen 336 may be movable with respect to dividing member 347 in a direction parallel to the illustrated X-axis. As shown in these figures, a tracking opening 360 defined in display screen 336 may extend obliquely relative to the direction of movement of display screen 336. Additionally, a dividing-member opening 352 defined in dividing member 347 may extend along a Y-axis in a direction perpendicular to the direction of movement of display screen 336.

As shown in FIG. 12A, tracking opening 360 may overlap dividing-member opening 352 at an overlapping opening region 376, through which rearward emitted light from display screen 336 may pass. As shown in FIG. 12B, when display screen 336 is moved to a second position in a direction parallel to the X-axis, overlapping opening region 376 may be shifted in a direction parallel to the Y-axis but may not be shifted in a direction parallel to the X-axis. Additionally, as shown in FIG. 12C, when display screen 336 is moved to a third in a direction parallel to the X-axis, overlapping opening region 376 may be further shifted in a direction parallel to the Y-axis but may not be shifted in a direction parallel to the X-axis.

Figure 13A:
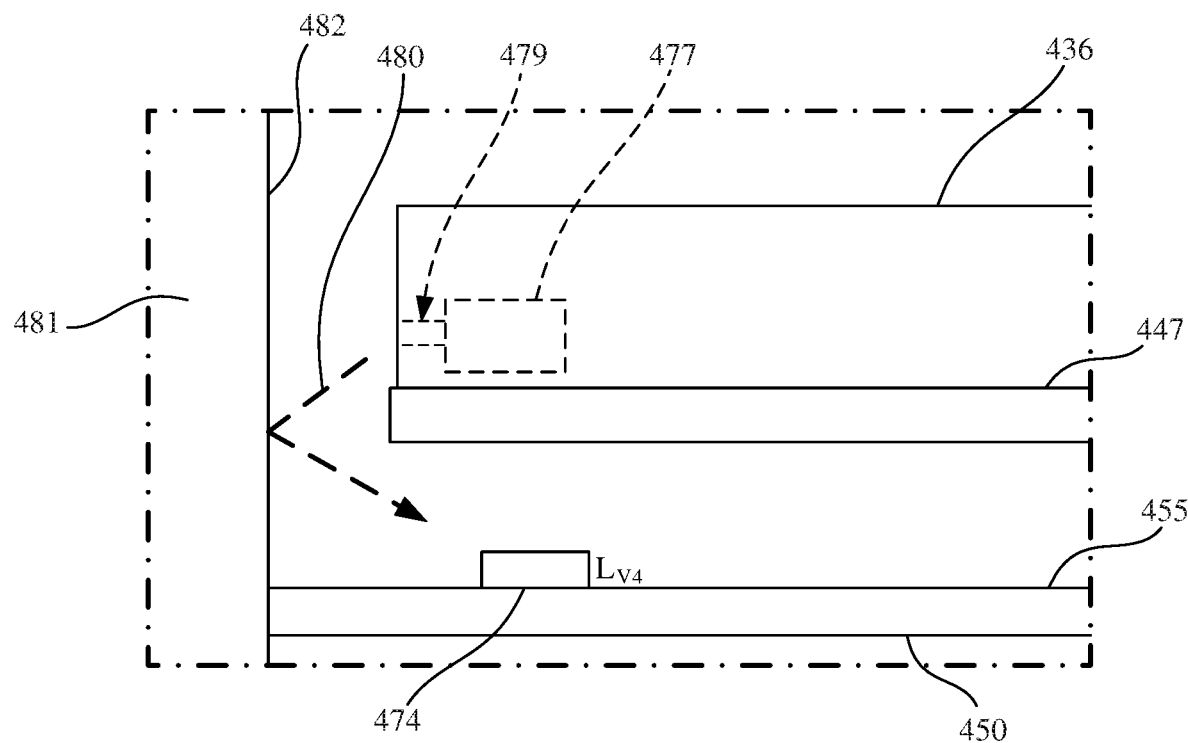
FIGS. 13A and 13B are top views of exemplary left- and right-eye display screens and exemplary optical sensors mounted on a printed circuit board in accordance with some embodiments.
Figure 13B:
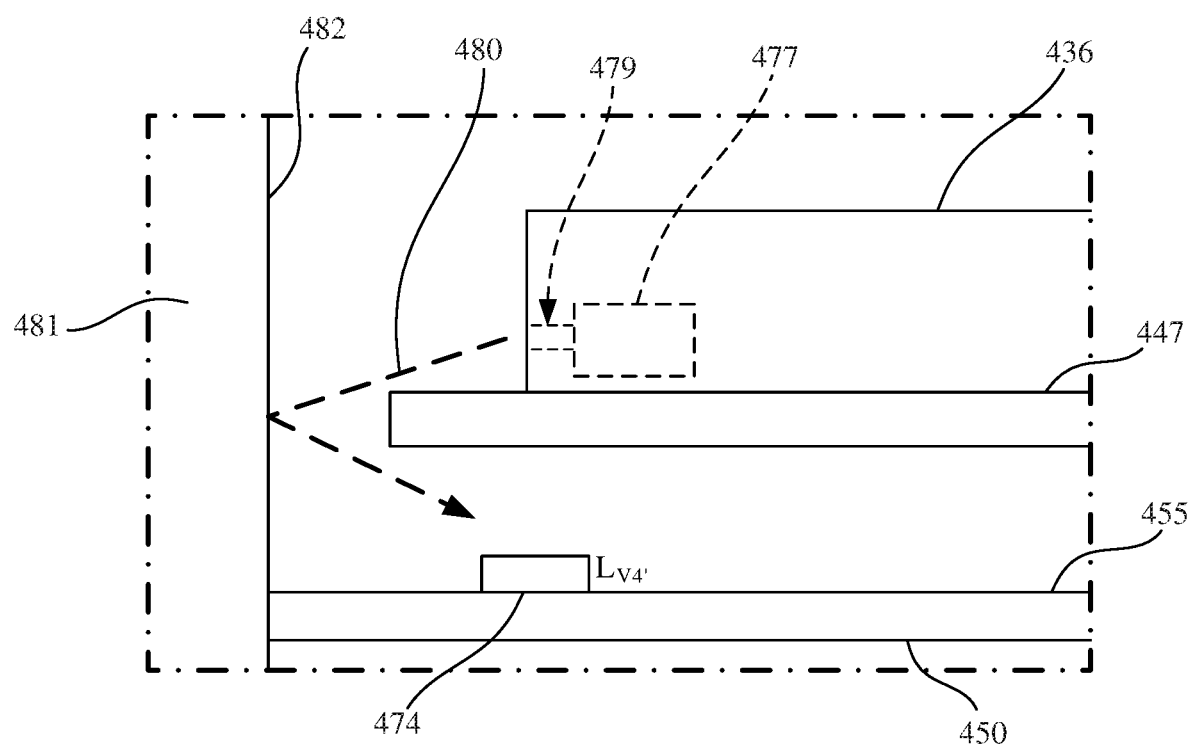

FIGS. 13A and 13B show top views of portions of display screen 436 (e.g., a right-eye display screen), dividing member 447, and printed circuit board 450 of an exemplary head-mounted-display device. According to some embodiments, as shown in these figures, light for determining a position of display screen 436 may be emitted from a side portion of display screen 436.

Display screen 436 may be movable with respect to dividing member 447 and printed circuit board 450. In at least one embodiment, display screen 436 may include a backlight unit (e.g., backlight unit 162 shown in FIG. 5) having a light source 477, such as an LED array. In some embodiments, a tracking opening 479 for emitting light from a peripheral side portion of light source 477 and/or from any other suitable portion of display screen 436 may be defined in a portion of display screen 436. For example, tracking opening 479 may be defined in a light-blocking layer disposed on a side portion of light source 477. In some embodiments, a side member 481 of a head-mounted-display device may be disposed near a portion of display screen 436, such as light source 477. In at least one example, at least a portion of side member 481 may include a reflective surface 482 that reflects side-emitted light 480 emitted from tracking opening 479 of display screen 136. At least one optical sensor may be mounted to a front surface 455 of printed circuit board 450, which is positioned behind dividing member 447. A portion of side-emitted light 480 reflected by side member 481 may be incident on optical sensor 474. For example, as shown in FIG. 13A, optical sensor 474 may measure an amount of light represented by luminance value $L_{V4}$.

As shown in FIG. 13B, when display screen 436 is moved relative to side member 481 and printed circuit board 450, an angle of incidence of a portion of side-emitted light 480 detected by optical sensor 474 may change. Additionally, the amount of side-emitted light 480 detected by optical sensor 474 may be lower in the configuration shown in FIG. 13B than in the configuration shown in FIG. 13A. As illustrated in FIG. 13B, optical sensor 474 may measure an amount of light represented by luminance value $L_{V4'}$, which may, for example, be lower than luminance value $L_{V4}$ detected in the configuration shown in FIG. 13A. Luminance values measured by optical sensor 474, such as exemplary luminance values $L_{V4}$ and $L_{V4'}$, may be correlated to positions of display screen 436 using any suitable technique. Any suitable number of optical sensors may be disposed on printed circuit board 450 and/or any other portion of the head-mounted-display device in any suitable configuration. According to some embodiments, one or more optical sensors may be disposed on a portion of head-mounted-display device, such as a portion of side member 481, such that side-emitted light 480 is incident on the one or more optical sensors without first being reflected by a reflective surface such as reflective surface 482.

Figure 14:
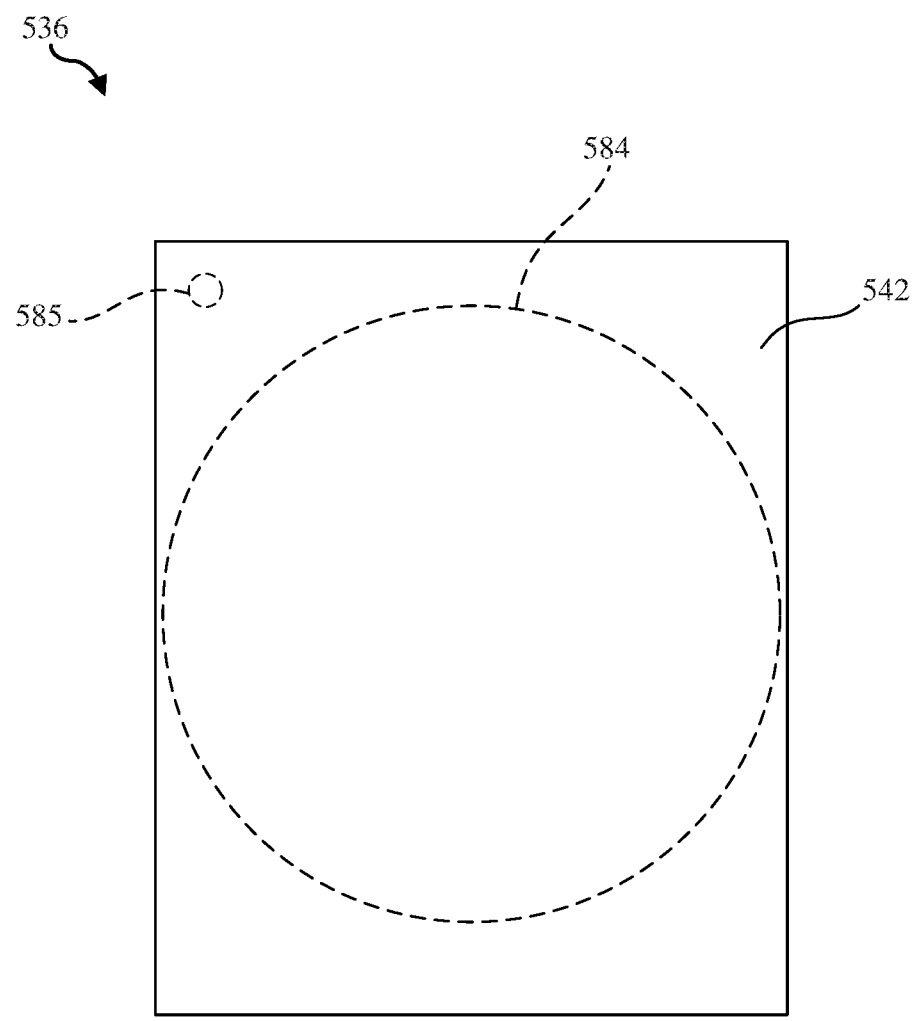
FIG. 14 is a front view of an exemplary display screen in accordance with some embodiments.

FIG. 14 shows a front view of an exemplary display device 536 of a head-mounted-display device. According to some embodiments, display device 536 may be a suitable display device (e.g., an OLED device, an LCD device, etc.) that includes one or more tracking areas located on an image projecting side of display device 536. For example, as shown in this figure, display device 536 may include a tracking area 585 disposed on front surface 542 in a region outside of a viewing area 584 of display device 536. Viewing area 584 may correspond to a portion of display device 536 that is visible to an eye of a user (e.g., a portion visible in a viewing region 141 of display assembly 124 shown in FIG. 4). At least one sub-pixel within tracking area 585 of display device 536 may be selectively illuminated such that light for determining a position of display device 536 is emitted from tracking area 585. One or more optical sensors may be positioned in a head-mounted-display device to receive light emitted from tracking area 585 of display device 536. For example, at least one optical sensor may be disposed in front of a portion of front surface 542 that includes tracking area 585. Additionally or alternatively, the head-mounted-display device may include one or more optical elements (e.g., a collimator, focusing element, a reflector, etc.) configured to direct light toward at least one optical sensor disposed in any suitable location outside of a viewing region that includes viewing area 584. The at least one optical sensor may determine a position of display device 536 based on amounts of light measured by the at least one optical sensor using any suitable technique.

Figure 15:
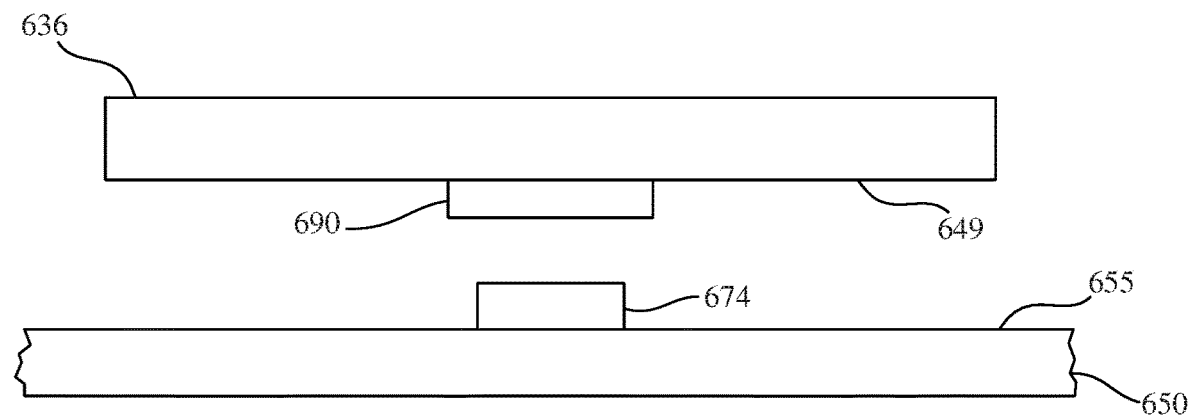
FIG. 15 is a top view of an exemplary display screen and an exemplary magnetic field sensor mounted on a printed circuit board in accordance with some embodiments.
Figure 16:
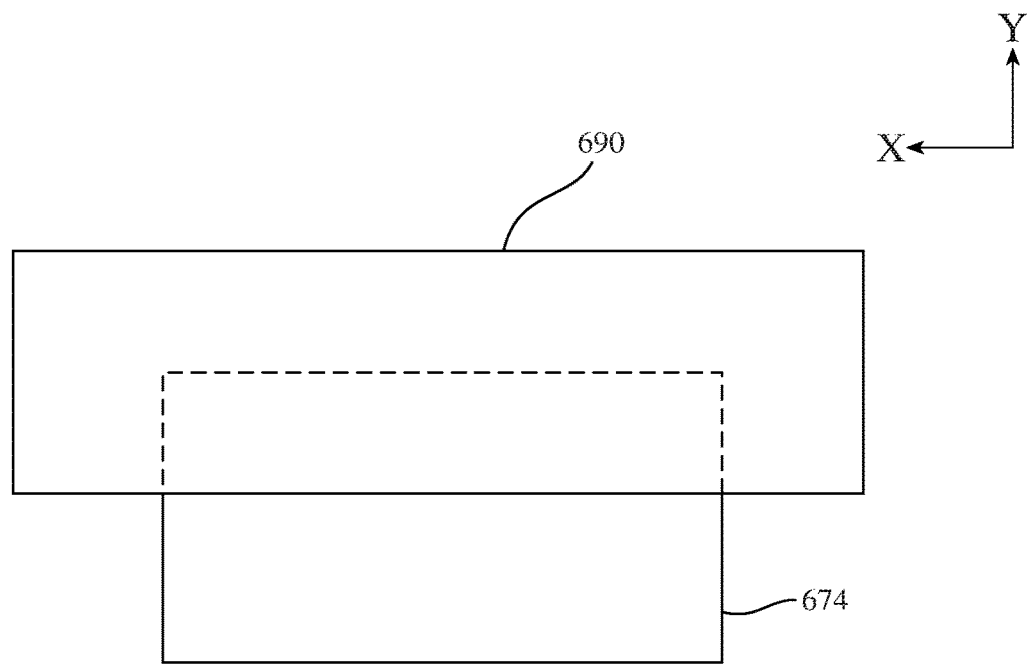
FIG. 16 is a rear view of an exemplary magnetic element and an exemplary magnetic field sensor mounted on a printed circuit board in accordance with some embodiments.

FIG. 15-18 illustrate an apparatus and system for determining a location of a display screen and a head-mounted-display device using a magnetic field. FIG. 15 shows a side view and FIG. 16 shows a rear view of an exemplary display screen 636 positioned near a printed circuit board 650 of a head-mounted-display device. According to some embodiments, at least one magnetic element may be disposed on a back portion of a display assembly (e.g., display assembly 124 shown in FIG. 4). For example, a magnetic element 690 may be disposed on a back surface 649 of display screen 636. Additionally, at least one magnetic field sensor may be disposed on at least a portion of the head-mounted-display device in close proximity to magnetic element 690. For example, a magnetoresistive sensor 674 may be disposed on a front surface 655 of printed circuit board 650 facing magnetic element 690. Magnetoresistive sensor 674 may be positioned within a suitable proximity to magnetic element 690 allowing for a magnetic field emitted by magnetic element 690 to sufficiently interact with magnetoresistive sensor 674. In at least one embodiment, magnetoresistive sensor 674 may be utilized to detect a position and/or displacement of magnetic element 690 with respect to magnetoresistive sensor 674 (e.g., in a direction parallel to the X-axis shown in FIG. 16).

Figure 17:
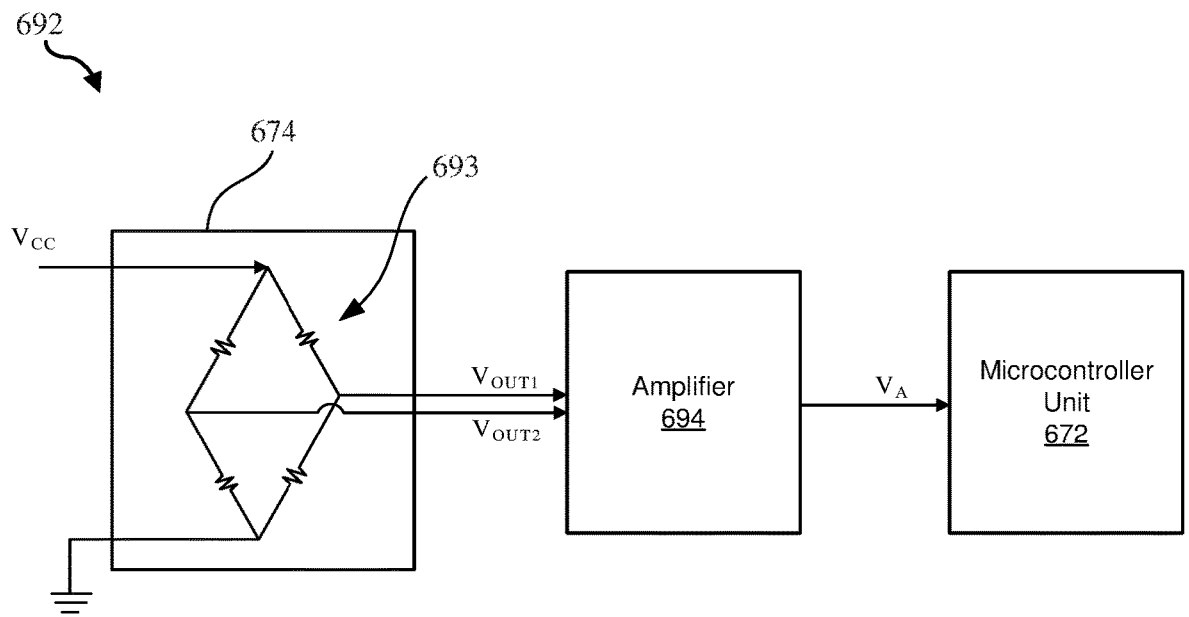
FIG. 17 is a diagram of an exemplary system for determining interpupillary distances of head-mounted displays in accordance with some embodiments

FIG. 17 illustrates an exemplary system 692 for determining a position of display screen 636 using magnetoresistive sensor 674. Magnetoresistive sensor 674 may be any suitable magnetoresistive sensor suitable for detecting a position of magnetic element 690. For example, magnetoresistive sensor 674 may be an anisotropic magnetoresistive sensor having a plurality of resistors for detecting changes in the presence of the magnetic field surrounding magnetic element 690. In some embodiments, magnetoresistive sensor 674 may include four resistors 693 electrically coupled together in a Wheatstone bridge, as illustrated in FIG. 17. Magnetoresistive sensor 674 may, for example, be electrically coupled to a voltage source, such as a constant current voltage $V_{CC}$, and to ground. Voltages $V_{OUT1}$ and $V_{OUT2}$ may be output from magnetoresistive sensor 674 to an amplifier 694, which outputs an amplified voltage signal $V_A$. The amplified voltage signal $V_A$ may then be processed to determine a position of magnetic element 690. In at least one embodiment, system 692 may include a microcontroller unit 672 that converts amplified voltage signal $V_A$ to a digital signal via, for example, an analog-to-digital converter. The digital signal may then be correlated to a position of magnetic element 690 with respect to magnetoresistive sensor 674.

Figure 18:
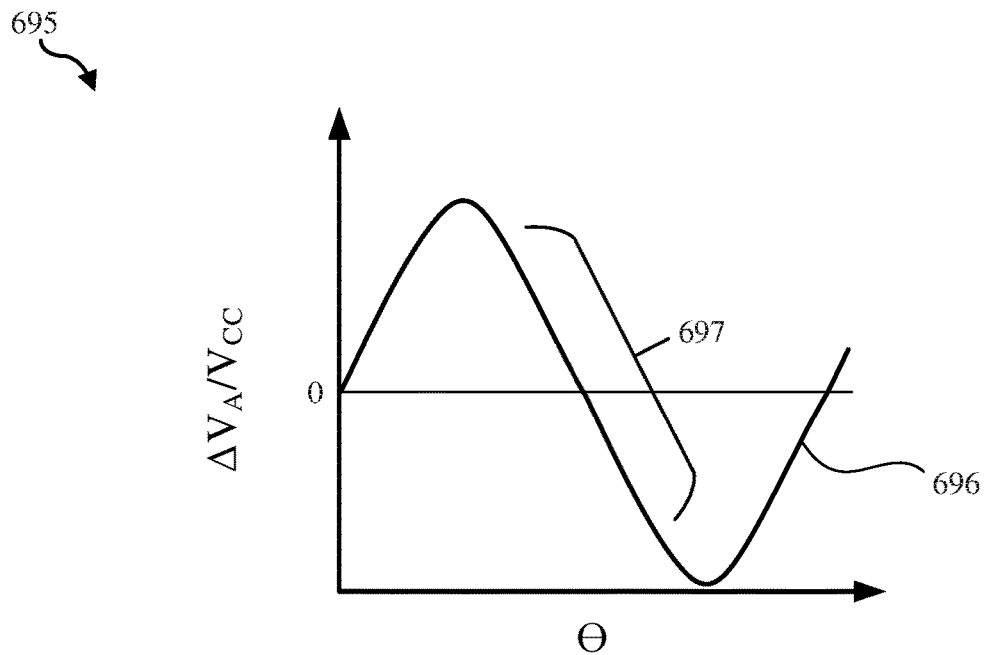
FIG. 18 is an exemplary graph showing a relationship between a signal obtained by the system of FIG. 17 and a position of a display screen.

FIG. 18 shows an exemplary graph 695 illustrating a relationship between amplified voltage signal $V_A$ obtained by system 692 as described above and a relative position of magnetic element 690. As shown in this figure, a change in amplified voltage signal $V_A$ divided by the input constant current voltage $V_{CC}$ (i.e., $\Delta V_A/V_{CC}$) may be plotted against an angular direction of a magnetic field (i.e., angle θ) of magnetic element 690. A plotted line 696 of graph 695 may have a sinusoidal shape that includes a substantially linear region 697. Various points along plotted line 696 within substantially linear region 697 may be correlated to corresponding positions of magnetic element 690 with respect to magnetoresistive sensor 674. Based on a position of magnetic element 690, a position of display screen 636 may be determined for purposes of, for example, determining an interpupillary distance.

Figure 19:
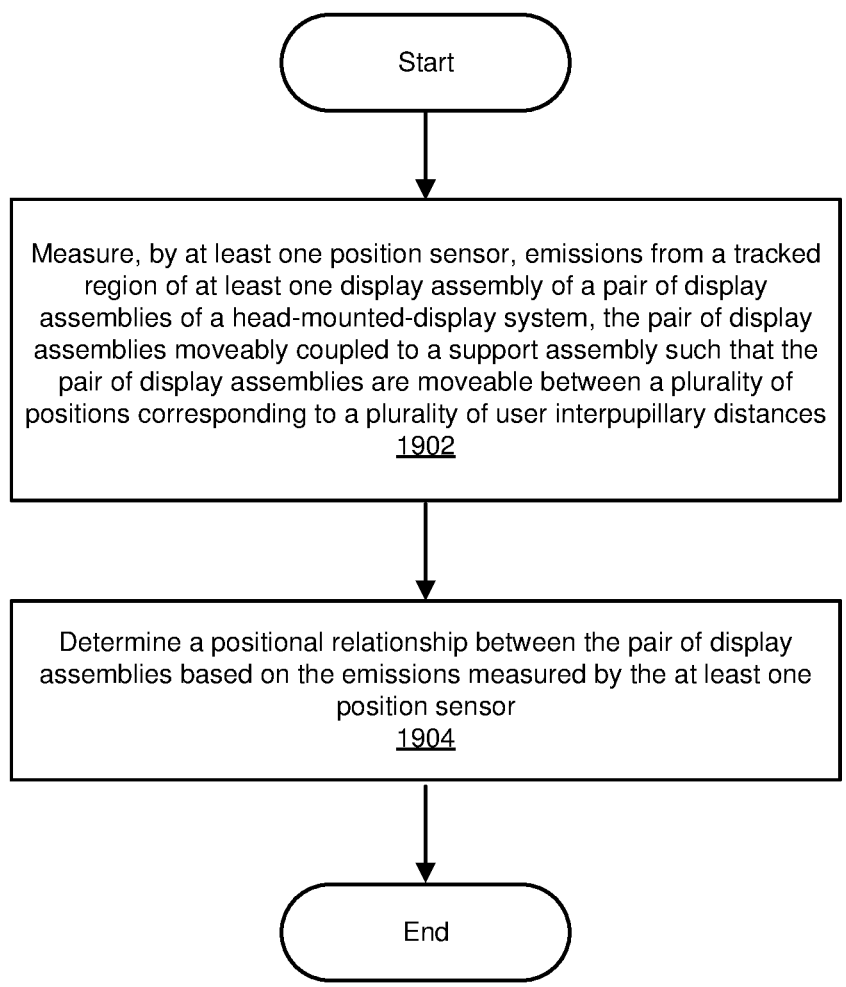
FIG. 19 is a flow diagram of an exemplary method for determining interpupillary distances of head-mounted displays in accordance with some embodiments.

FIG. 19 is a flow diagram of an exemplary computer-implemented method 1900 for determining interpupillary distances of head-mounted displays. As illustrated in FIG. 19, at step 1902 at least one position sensor of a detection subsystem may measure emissions from a tracked region of at least one display assembly of a pair of display assemblies of a head-mounted-display system. For example, at least one position sensor 127 of detection subsystem 126 may measure emissions (e.g., light emissions, an emitted magnetic field, etc.) from a tracked region of at least one of left- and right-eye display assemblies 124A and 124B of head-mounted-display system 100 (see, e.g., FIGS. 1, 2, 4, 5, 10A, and 10B; see also FIGS. 13A, 13B, 14-18). In some embodiments, left- and right-eye display assemblies 124A and 124B may be moveably coupled to a support assembly 146 such that the display assemblies are moveable between a plurality of positions corresponding to a plurality of user interpupillary distances (see, e.g., FIGS. 3A-4 and 9A-10B; see also FIGS. 11A-13B, 15, and 16).

At step 1904, a determination module may determine a positional relationship between the pair of display assemblies based on the emissions measured by the at least one position sensor. For example, determination module 128 may determine a positional relationship between left- and right-eye display assemblies 124A and 124B based on the emissions measured by the at least one position sensor 127. (See, e.g., FIGS. 2-4 and 9A-10B; see also FIGS. 11A-13B, 15, and 16).

According to at least some embodiments, a display adjustment assembly may adjust positions of the pair of display assemblies with respect to each other. In these examples, at least one position sensor of the detection subsystem may measure additional emissions from the tracked region of the at least one display assembly of the pair of display assemblies disposed in the adjusted positions. Additionally, the determination module may determine an adjusted positional relationship between the pair of display assemblies based on the additional emissions measured by the at least one position sensor. For example, display adjustment assembly 125 may adjust positions of left- and right-eye display assemblies 124A and 124B with respect to each other. The at least one position sensor 127 may measure additional emissions from the tracked region of the at least one left- and right-eye display assemblies 124A and 124B disposed in the adjusted positions. Additionally, determination module 128 may determine an adjusted positional relationship between left- and right-eye display assemblies 124A and 124B based on the additional emissions measured by the at least one position sensor 127 (see, e.g., FIGS. 2-4 and 9A-10B; see also FIGS. 11A-13B, 15, and 16).

Figure 20A:
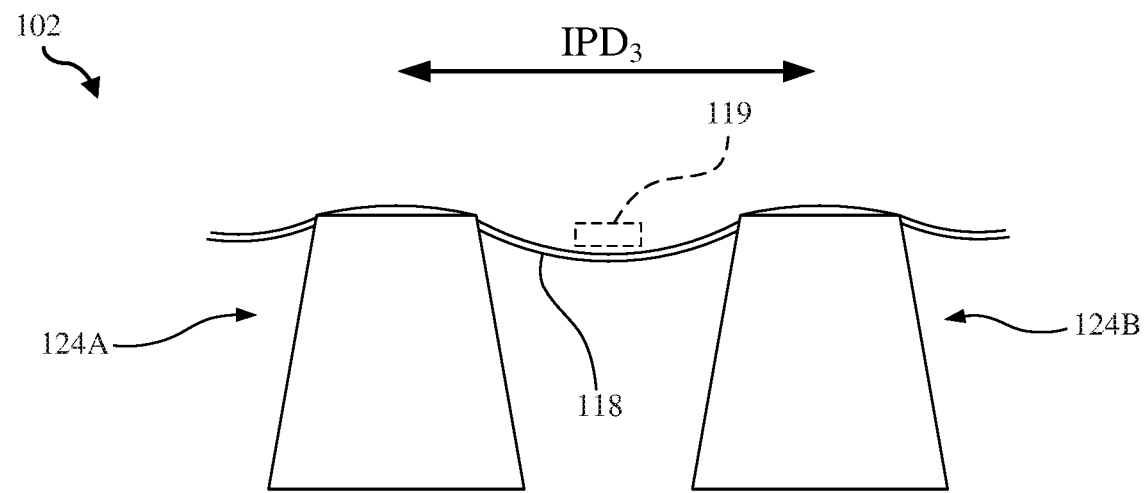
FIGS. 20A and 20B are partial cross-sectional top views of a portion of an exemplary head-mounted-display device in accordance with some embodiments.
Figure 20B:
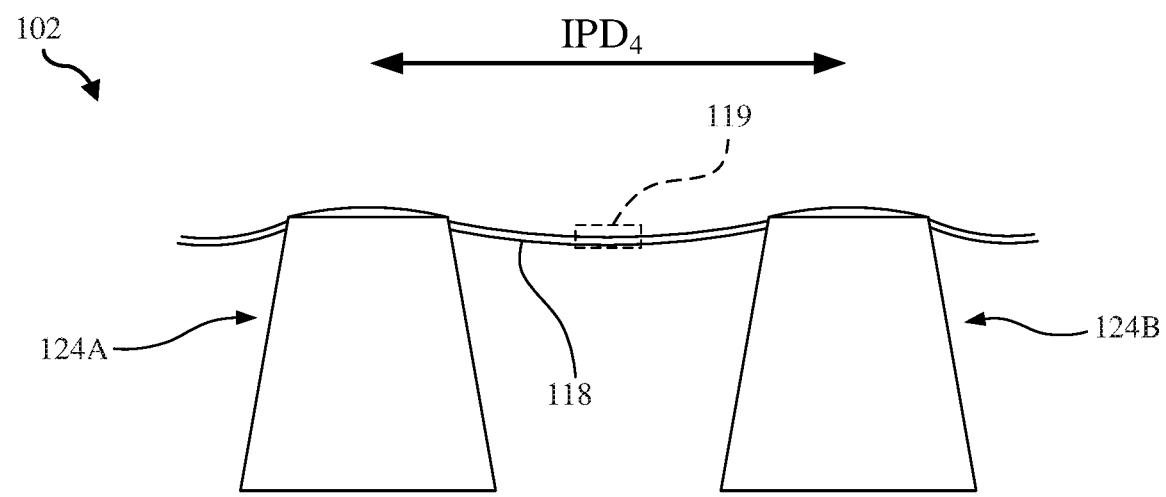

FIGS. 20A and 20B show top partial cross-sectional views of a portion of an exemplary head-mounted-display device 102 (see, e.g., FIGS. 3A and 3B). These figures illustrate, for example, a portion of a light-blocking layer 118 extending between a left-eye display assembly 124A and a right-eye display assembly 124B of head-mounted-display device 102. Additionally, a relative position of a proximity sensor 119 of head-mounted-display device 102 is illustrate (see, e.g., FIGS. 3A and 3B). Proximity sensor 119 may, for example, be an optical proximity sensor that detects amounts of incident light from a surrounding area.

A decrease in a level of light detected by proximity sensor 119, such as a decrease below a specified threshold level, may indicate that head-mounted-display device 102 is disposed against a user's face. Such detection by proximity sensor 119 may be utilized by head-mounted-display device 102 (e.g, by detection subsystem 126 shown in FIG. 2) to indicate whether or not head-mounted-display device 102 is worn by a user. For example, when head-mounted-display device 102 is turned on and proximity sensor 119 detects a level of light indicating that head-mounted-display device 102 is mounted to a user's head, head-mounted-display device 102 may display images on display screens (e.g., left- and right-eye display screens 136A and 136B shown in FIGS. 3A and 3B) of head-mounted-display device 102. Alternatively, when proximity sensor 119 detects a level of light above a specified threshold level, which may indicate that head-mounted-display device 102 is no longer worn by a user, display screens of head-mounted-display device 102 may cease displaying images. In some examples, when it is determined that head-mounted-display device 102 is not worn by the user, head-mounted-display device 102 may additionally or alternatively cease operation of various other electronic components of head-mounted-display device 102 and/or may enter an OFF state or a low-power use state, such as a sleep, standby, or hibernate mode.

Figure 21:
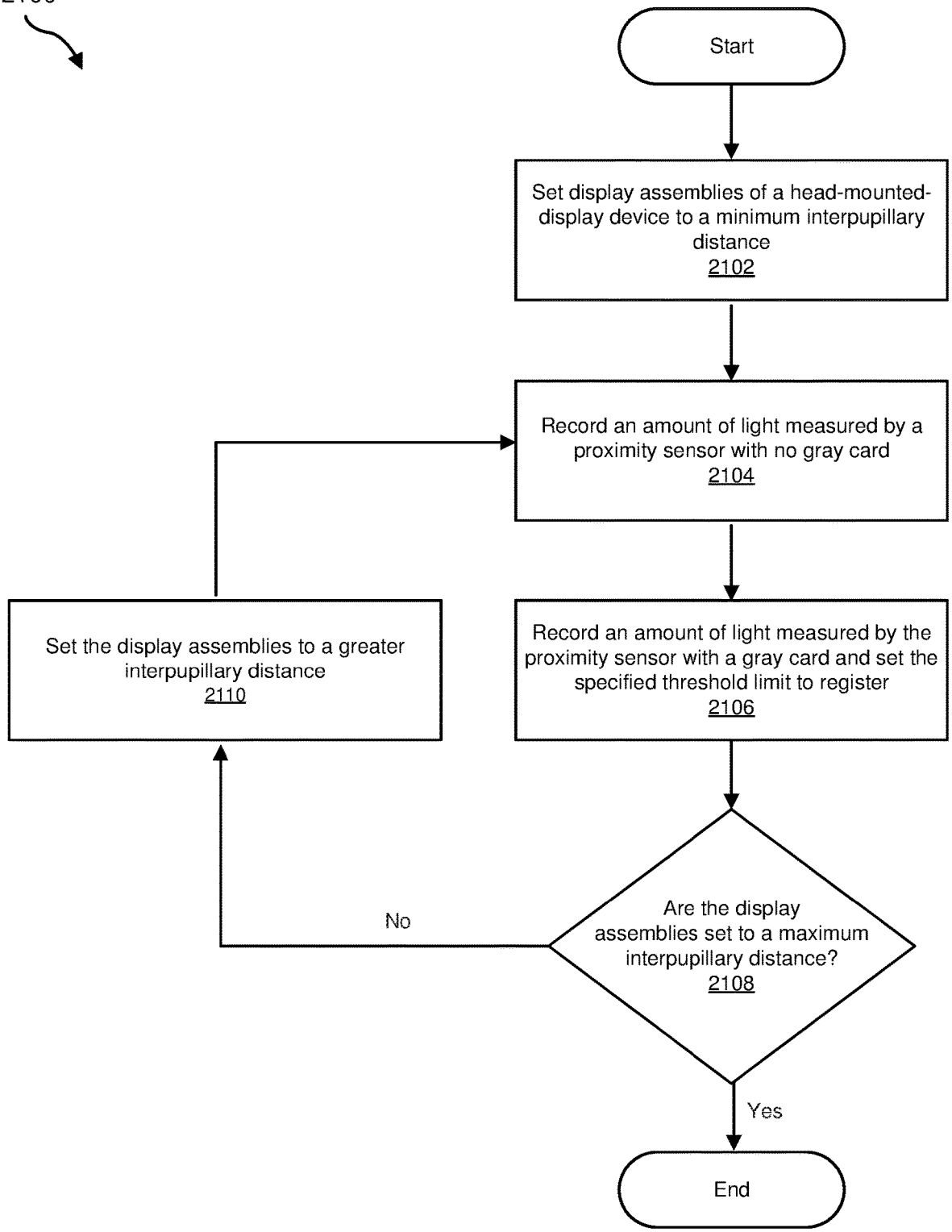
FIG. 21 is a flow diagram of an exemplary method for calibrating proximity sensors of head-mounted displays in accordance with some embodiments.

According to some embodiments, when left- and right-eye display assemblies 124A and 124B are disposed at locations corresponding to various user interpupillary distances, such as interpupillary distance $IPD_3$ shown in FIG. 20A, proximity sensor 119 may not be occluded by light-blocking layer 118. In at least one example, when left- and right-eye display assemblies 124A and 124B are disposed at locations corresponding to relatively wider interpupillary distances, such as interpupillary distance $IPD_4$ shown in FIG. 20B, at least a portion of proximity sensor 119 may be occluded by an adjacent region of light-blocking layer 118, which may be stretched or taught between left- and right-eye display assemblies 124A and 124B. When at least a portion of proximity sensor 119 is blocked by light-blocking layer 118, light may be prevented from reaching proximity sensor 119 such that an amount of light detected by proximity sensor 119 may be below a specified threshold level, falsely indicating that head-mounted-display device 102 is mounted to a user's head in situations when head-mounted-display device 102 is not actually mounted to the user's head. In some embodiments, head-mounted-display device 102 may be calibrated such that a plurality of different threshold levels are set for a plurality of positions of left- and right-eye display assemblies 124A and 124B corresponding to various interpupillary distances. In at least one example, such threshold levels may be individually set for each head-mounted-display device 102. A gray card (e.g., a middle gray reference card) may be utilized, for example, to set different threshold levels corresponding to different positions of left- and right-eye display assemblies 124A and 124B and/or interpupillary distances FIG. 21 is a flow diagram of an exemplary method 2100 for calibrating a proximity sensor 119. As shown in FIG. 21, at step 2102, display assemblies of a head-mounted-display device may be set to a minimum interpupillary distance. For example, as shown in FIG. 20A, left- and right-eye display assemblies 124A and 124B may be set to a position corresponding to a minimum interpupillary distance (e.g., interpupillary distance $IPD_3$).

At step 2104, an amount of light measured by the proximity sensor may be recorded with no gray card. For example, an amount of light measured by proximity sensor 119 may be detected based on light received by proximity sensor 119 from a local area when no gray card is disposed in close proximity to proximity sensor 119.

At step 2106, an amount of light measured by the proximity sensor of the head-mounted-display device may be recorded with a gray card and the specified threshold limit may be set to register. For example, an amount of light measured by proximity sensor 119 may be measured based on light received by proximity sensor 119 when a gray card is disposed near proximity sensor 119 (e.g., the gray card may be positioned at a predetermined distance from proximity sensor 119). The measured light value may then be set to register as a specified threshold limit that indicates that head-mounted-display device 102 is worn by a user. The specified threshold limit may be specific to the current interpupillary distance position (i.e., minimum interpupillary distance $IPD_3$ when step 2106 is initially carried out) of left- and right-eye display assemblies 124A and 124B when step 2106 is carried out.

At step 2108, a determination of whether the display assemblies are set to a maximum interpupillary distance may be made. For example, determination module 128 (see FIG. 2) may determine whether left- and right-eye display assemblies 124A and 124B are set to positions corresponding to a maximum interpupillary distance (e.g., interpupillary distance $IPD_4$ shown in FIG. 20B) at which left- and right-eye display assemblies 124A and 124B may be disposed in head-mounted-display device 102 when step 2108 is carried out. The determination of the current positions of left- and right-eye display assemblies 124A and 124B may be determined utilizing any of the systems, assemblies, and/or method described herein. If it is determined that left- and right-eye display assemblies 124A and 124B are set to a position corresponding to the maximum interpupillary distance, calibration method 2100 may end. However, if it is determined that left- and right-eye display assemblies 124A and 124B are not set to a position corresponding to the maximum interpupillary distance, calibration method 2100 may continue to step 2110.

At step 2110, the display assemblies may be set to a greater interpupillary distance. For example, left- and right-eye display assemblies 124A and 124B may be set to a position corresponding to a greater interpupillary distance. Calibration method 2100 may then repeat steps 2104-2110 until it is determined at step 2108 that left- and right-eye display assemblies 124A and 124B are set to positions corresponding to the maximum interpupillary distance.

The disclosed apparatuses, systems, and methods may enable precise determination of a user's interpupillary distance based, for example, on positional relationships between the display assemblies. Such interpupillary distance determinations may be made while minimizing the weight, mechanical complexity, and/or cost of the head-mounted-display devices. In some embodiments, for example, one or more position sensors may measure emissions from conventional display components, such as light emitted from display screens, thereby minimizing additional components required to perform interpupillary distance determinations. Additionally or alternatively, various sensors, such as optical sensors and/or magnetic field sensors, may be utilized to calculate interpupillary distances by tracking the positions of various display components without contact between the sensors and the tracked components. Accordingly, the disclosed apparatuses, systems, and methods may also provide for smoother and finer adjustment of optical elements in comparison to conventional interpupillary measurement apparatuses. In at least one embodiment, calculated interpupillary distances may be utilized to better calibrate one or more components, such as proximity sensors of head-mounted-display devices.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to," "coupled to," and "attached to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Additionally, for ease of use, the terms "including" and "having" (and their derivatives), as used in the specification and claims, are interchangeable with and have the same meaning as the word "comprising." It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind."

What is claimed is:

1. A head-mounted-display system comprising:
    a support assembly;
    a pair of display assemblies moveably coupled to the support assembly such that the pair of display assemblies are moveable between a plurality of positions corresponding to a plurality of user interpupillary distances, the pair of display assemblies respectively defining separate viewing regions for a user's right and left eyes, each of the pair of display assemblies comprising:
        a lens; and
        a display screen having a display area that projects image light from a front surface of the display screen toward the lens; and
    a detection subsystem comprising:
        at least one position sensor that measures emissions from a tracked region located on a back surface or a peripheral side surface of at least one display assembly of the pair of display assemblies; and
        a determination module that determines a positional relationship between the pair of display assemblies based on the emissions measured by the at least one position sensor.

2. The head-mounted-display system of claim 1, wherein the positional relationship between the pair of display assemblies comprises a user interpupillary distance corresponding to a position of the pair of display assemblies with respect to each other.

3. The head-mounted-display system of claim 1, wherein the at least one position sensor comprises at least one optical sensor that measures quantities of light emitted from the tracked region of the at least one display assembly.

4. The head-mounted-display system of claim 3, wherein:
    the tracked region of the at least one display assembly comprises a tracking opening defined in a back light-blocking layer of the display screen of the at least one display assembly that is disposed opposite the front surface of the display screen of the at least one display assembly; and
    a portion of light generated by the display screen passes through the tracking opening.

5. The head-mounted-display system of claim 4, wherein:
    the support assembly comprises a dividing member extending between the display screen of the at least one display assembly and the at least one optical sensor; and
    a dividing-member opening is defined in a portion of the dividing member that at least partially overlaps the tracking opening defined in the back light-blocking layer of the display screen of the at least one display assembly.

6. The head-mounted-display system of claim 5, wherein:
    the tracking opening defined in the back light-blocking layer of the display screen of the at least one display assembly extends longitudinally in a first direction parallel to a back surface of the back light-blocking layer; and the dividing-member opening defined in the dividing member of the support assembly extends longitudinally in a second direction that is nonparallel to the first direction.

7. The head-mounted-display system of claim 3, further comprising at least one reflective element for reflecting at least a portion of the light emitted from the tracked region of the at least one display assembly toward the at least one optical sensor, wherein the at least one reflective element is disposed outside the pair of display assemblies.

8. The head-mounted-display system of claim 3, further comprising at least one collimator for directing at least a portion of light emitted from the tracked region of the at least one display assembly toward the at least one optical sensor.

9. The head-mounted-display system of claim 1, wherein:
the tracked region of the at least one display assembly comprises a magnetic element; and
the at least one position sensor comprises at least one magnetic field sensor that measures a magnetic field emitted by the magnetic element.

10. The head-mounted-display system of claim 9, wherein the at least one magnetic field sensor comprises a magnetoresistive sensor.

11. The head-mounted-display system of claim 1, wherein:
the at least one position sensor comprises a plurality of discrete position sensors that each measure the emissions from the tracked region of the at least one display assembly; and
the determination module determines the positional relationship between the pair of display assemblies based on the emissions measured by the plurality of discrete position sensors.

12. The head-mounted-display system of claim 1, wherein the tracked region of the at least one display assembly is located outside the display area.

13. The head-mounted-display system of claim 1, wherein the emissions from the tracked region of the at least one display assembly comprise light emitted from a back surface of the display screen of the at least one display assembly that is opposite the front surface of the display screen of the at least one display assembly through which image light is projected.

14. The head-mounted-display system of claim 1, wherein the at least one position sensor is disposed on a printed circuit board.

15. The head-mounted-display system of claim 1, further comprising a display adjustment assembly for adjusting positions of the pair of display assemblies with respect to each other.

16. A head-mounted-display device comprising:
a display housing;
a support assembly mounted to the display housing;
a pair of display assemblies moveably coupled to the support assembly such that the pair of display assemblies are moveable between a plurality of positions corresponding to a plurality of user interpupillary distances, the pair of display assemblies respectively defining separate viewing regions for a user's right and left eyes, each of the pair of display assemblies comprising:
a lens; and
a display screen having a display area that projects image light from a front surface of the display screen toward the lens; and
a detection subsystem comprising:
at least one position sensor that measures emissions from a tracked region located on a back surface or a peripheral side surface of at least one display assembly of the pair of display assemblies; and
a determination module that determines a positional relationship between the pair of display assemblies based on the emissions measured by the at least one position sensor.

17. The head-mounted-display device of claim 16, wherein:
the display housing comprises a viewing opening and an end surface disposed opposite the viewing opening; and
the at least one position sensor is disposed between the tracked region of the at least one display assembly and the end surface of the display housing.

18. A method comprising:
measuring, by at least one position sensor of a detection subsystem, emissions from a tracked region located on a back surface or a peripheral side surface of at least one display assembly of a pair of display assemblies of a head-mounted-display system, the pair of display assemblies moveably coupled to a support assembly such that the pair of display assemblies are moveable between a plurality of positions corresponding to a plurality of user interpupillary distances, the pair of display assemblies respectively defining separate viewing regions for a user's right and left eyes, each of the pair of display assemblies comprising:
a lens; and
a display screen having a display area that projects image light from a front surface of the display screen toward the lens; and
determining, by a determination module, a positional relationship between the pair of display assemblies based on the emissions measured by the at least one position sensor.

19. The method of claim 18, further comprising:
adjusting, by a display adjustment assembly, positions of the pair of display assemblies with respect to each other;
measuring, by the at least one position sensor of the detection subsystem, additional emissions from the tracked region of the at least one display assembly of the pair of display assemblies disposed in the adjusted positions; and
determining, by the determination module, an adjusted positional relationship between the pair of display assemblies based on the additional emissions measured by the at least one position sensor.

20. The method of claim 18, wherein the at least one position sensor comprises at least one of an optical sensor and a magnetic field sensor.

* * * * *